(12) United States Patent  
Sakamoto et al.

(10) Patent No.: US 7,015,996 B2  
(45) Date of Patent: Mar. 21, 2006

(54) TRANSFLECTIVE LIQUID CRYSTAL DISPLAY DEVICE WITH VARYING LIQUID CRYSTAL LAYER THICKNESS AS A FUNCTION OF LIQUID CRYSTAL LAYER TWIST ANGLE

(75) Inventors: Michiaki Sakamoto, Tokyo (JP); Osamu Sukegawa, Tokyo (JP); Hidenori Ikeno, Tokyo (JP)

(73) Assignees: NEC Corporation, Tokyo (JP), part interest; NEC LCD Technologies, Inc., Kanagawa (JP), part interest ( * ) Notice: Subject to any disclaimer, the term of this patent is extended or adjusted under 35 U.S.C. 154(b) by 48 days.

(21) Appl. No.: 10/298,908

(22) Filed: Nov. 19, 2002

(65) Prior Publication Data

US 2003/0095217 A1    May 22, 2003

(30) Foreign Application Priority Data

Nov. 20, 2001    (JP)    ............................. 2001-355210

(51) Int. Cl.  
G02F 1/1335    (2006.01)  
C09K 19/02    (2006.01)

(52) U.S. Cl. ..................... 349/113; 349/114; 349/180

(58) Field of Classification Search ................ 349/114, 349/113  
See application file for complete search history.

(56) References Cited

U.S. PATENT DOCUMENTS 5,966,195 A * 10/1999 Sato et al. .................. 349/187  
6,195,140 B1 * 2/2001 Kubo et al. ................... 349/44  
6,522,377 B1 * 2/2003 Kim et al. ................. 349/114  
6,657,689 B1 * 12/2003 Baek .......................... 349/114

FOREIGN PATENT DOCUMENTS

| JP | 2955277 | 7/1999 |
| JP | 2000-187220 | 7/2000 |
| JP | 2000-267081 | 9/2000 |
| KR | 2001-0084736 | 9/2001 |

OTHER PUBLICATIONS

Merriam Webster's Collegiate Dictionary, 10TH Ed. at pp. 238, 254, 538, 1185-1186 © 1999.*  
Korean Office Action dated Jan. 21, 2005 (with partial English translation).

* cited by examiner

Primary Examiner—Andrew Schechter  
Assistant Examiner—Jeanne Andrea Di Grazio  
(74) Attorney, Agent, or Firm—McGinn IP Law Group, PLLC

(57) ABSTRACT

In a semi-transmissive liquid crystal display device, the thickness of liquid crystal layer in the reflective region can be adjusted by controlling the film thickness of the organic insulating film for reflection and the film thickness of the color layer for reflection. Furthermore, the thickness of liquid crystal layer in the transmissive region can be adjusted by controlling the film thickness of the organic insulating film for transmission and the film thickness of the color layer for transmission. Since the thicknesses of liquid crystal layer in the reflective region and that in the transmissive region can be adjusted, the reflectance in the reflective region and the transmittance in the transmissive region can each be set at the most appropriate values.

2 Claims, 20 Drawing Sheets

TRANSFLECTIVE LIQUID CRYSTAL DISPLAY DEVICE WITH VARYING LIQUID CRYSTAL LAYER THICKNESS AS A FUNCTION OF LIQUID CRYSTAL LAYER TWIST ANGLE

BACKGROUND OF THE INVENTION

1. Field of the Invention

The present invention relates to a liquid crystal display device and a method of manufacturing the same, and more particularly to a semi-transmissive liquid crystal display device and a method of manufacturing the same.

2. Description of Related Art

Conventionally, two types of liquid crystal display devices, a reflective liquid crystal display device and a transmissive liquid crystal display device, have been known. The former has a reflector therein, which reflects light entered from outside, and utilizes the light as a light source for display, eliminating the need for a backlight as a light source. The latter has a backlight therein as a light source.

The reflective liquid crystal display device provides an advantage over the transmissive liquid crystal display device in that the reflective one consumes lower electric power and is fabricated thinner and lighter. Accordingly, the reflective liquid crystal display device is utilized primarily as a portable terminal device. This is because the reflective liquid crystal display device utilizes light as a light source for display so that light entered from outside is reflected by a reflector provided within the device, eliminating the need for a backlight. The transmissive liquid crystal display device is able to display an image to be displayed, with visibility enhanced to a larger extent than that observed in the reflective liquid crystal display device when the surroundings are dark.

The current liquid crystal display device basically comprises a liquid crystal layer which is of one of twisted nematic (TN) crystal type, one sheet polarizer type, super twisted nematic (STN) crystal type, guest host (GH) type, polymer-dispersed liquid crystal (PDLC) type, cholesteric liquid crystal type and the like, a switching element for driving a liquid crystal cell, and a reflector provided inside or outside the liquid crystal cell or a backlight. The liquid crystal display device constructed as described above generally employs an active-matrix drive scheme to achieve high precision and high image quality by using as a switching element a thin film transistor (TFT) or a metal-insulator-metal (MIM) diode. The liquid crystal display device further includes a reflector or a backlight.

A semi-transmissive liquid crystal display device having both advantages observed respectively in the reflective and the transmissive liquid crystal display devices is disclosed in Japanese Patent No. 2955277 and configured as shown in FIG. 1. A gate wiring 2 and a drain wiring 3 are formed intersecting one another in directions orthogonal to each other and disposed along peripheries of a pixel electrode 1 on a TFT substrate (hereinafter, a substrate having a thin film transistor thereon is referred to as a TFT substrate). In this case, a thin film transistor 4 is assigned to the pixel electrode 1, and the gate wiring 2 and the drain wiring 3 are connected to a gate electrode and a drain electrode of the thin film transistor 4 respectively. In the pixel electrode 1 are formed a reflective region 5 (indicated by cross-hatch) made of a metal film and a transmissive region 6 made of an Indium-Tin-Oxide (ITO) film.

As described above, forming the transmissive region and the reflective region in the pixel electrode makes it possible to use a liquid crystal display device with a backlight turned off as a reflective liquid crystal display device when the surroundings are bright, thereby effecting low power consumption for a reflective liquid crystal display device. Furthermore, in a case where a liquid crystal display device is used as a transmissive liquid crystal display device when the surroundings are dark and the backlight is turned on, the liquid crystal display device enhances the visibility of an image to be displayed when the surroundings are dark, which operation is featured in a transmissive liquid crystal display device. Hereinafter, a liquid crystal display device used as both a reflective and a transmissive liquid crystal display devices is referred to as a semi-transmissive liquid crystal display device.

However, light travels different distances in a liquid crystal layer respectively when transmitting through a transmissive region 6, and when being incident on and reflected by a reflective region 5. Accordingly, the above-described regions have retardation values different from one another, causing the problem of impossibility of optimizing the intensity of light exiting from the device. To solve the problem, a liquid crystal display device disclosed in Japan Patent No. 2955277 is configured to have a cross section shown in FIG. 2. As shown in FIG. 2, the liquid crystal display device is configured to have an insulation layer 8 formed below a transparent electrode 7 of the reflective region 5 and dispose a reflector 9 above or below the insulation layer 8, causing a difference between a film thickness dr of a liquid crystal layer in the reflective region 5 and a film thickness df of a liquid crystal layer in the transmissive region 6.

FIG. 3 illustrates a graph indicating the result obtained by calculating the intensity of light exiting from the device and measured in a transmissive mode and a reflective mode based on a thickness of a liquid crystal layer when a twist angle Φ is equal to 0 degree. The graph indicates that the intensity of light exiting from the device and measured in a transmissive mode and a reflective mode varies depending on a thickness of a liquid crystal layer. The graph also indicates that both behaviors for the intensity of light traveling in a transmissive mode and a reflective mode are made nearly equal to each other when a ratio of the film thickness dr of a liquid crystal layer in the reflective region 5 to the film thickness df of a liquid crystal layer in the transmissive region 6 is set about 1:2 to eliminate a difference between distances which light travels through a liquid crystal layer in the reflective region 5 and the transmissive region 6. The inventors of this application further studied to optimize the intensity of light exiting from the reflective region and the transmissive region of the semi-transmissive liquid crystal display device constructed as described above. The results obtained by the study will be shown below.

(1) Optimization of the Intensity of Light Exiting from the Reflective Region and the Transmissive Region.

FIG. 4 is a diagram illustrating how light transmitting through the corresponding portions of a semi-transmissive liquid crystal display device is polarized. FIG. 5 is a diagram illustrating a relationship between the thickness of a liquid crystal layer and the twist angle of liquid crystal molecules. The semi-transmissive liquid crystal display device shown in FIG. 4 is assumed to have a reflective electrode 10 disposed on an insulation layer 8 shown in FIG. 2 and serving as a reflector.

As shown in FIG. 4, the semi-transmissive liquid crystal display device comprises a TFT substrate 11, an opposing substrate 12, a liquid crystal layer 13 interposed between the above-mentioned substrates, a backlight disposed below the TFT substrate 11 in the device, optical compensators 120, 220 and polarizers 123, 223 provided at corresponding outer positions of the TFT substrate 11 and the opposing substrate 12.

(Disposition of an Upper Polarzer and an Upper λ/4 Plate)

The optical compensator (λ/4 plate) 220 is disposed between the liquid crystal layer 13 and the polarizer 223 to establish a normally-white mode in the reflective region, which mode is defined such that a voltage is not applied between the opposing substrate and both the reflective region and the transmissive region to make liquid crystal molecules lie in parallel with the surfaces of the substrates and display "white," and a voltage is applied therebetween to make liquid crystal molecules rise up and display "black." The λ/4 plate 220 is made to rotate 45 degree, relative to an optical axis of the polarizer 223 and then interposed between the polarizer 223 and the liquid crystal layer 13, which configuration makes linearly (horizontally) polarized light transmitting through the polarizer 223 become right circularly polarized light after transmission through the λ/4 plate 220. The right circularly polarized light reaches the reflective electrode 10 maintaining itself as a linearly polarized light by setting a specific value for the film thickness dr of the liquid crystal layer in the reflective region. The linearly polarized light is reflected as it is by the reflective electrode 10 and becomes right circularly polarized light when exiting from the liquid crystal layer 10. The right circularly polarized light is made linearly (horizontally) polarized light by the λ/4 plate 220 and exits through the polarizer 223 with an optical axis parallel to a horizontal direction to the outside, thereby displaying a white color.

On the other hand, when a voltage is applied to the liquid crystal layer 13, liquid crystal molecules rise up. In this case, light entering the liquid crystal layer 13 as right circularly polarized light reaches the reflective electrode 10 maintaining itself as right circularly polarized light and is reflected as left circularly polarized light by the reflective electrode 10. Then, the left circularly polarized light exiting as it is from the liquid crystal layer 13 is converted to linearly (vertically) polarized light by the λ/4 plate 220 and does not exit from the device because the light is absorbed by the polarizer 223, thereby displaying a black color.

(Disposition of a Lower λ/4 Plate and a Lower Polarzer)

In a case where the liquid crystal display device is in a transmissive mode, an angular relationship between optical axes of the lower λ/4 plate 120 and the lower polarzer 123 is determined to display a black color during application of voltage to the liquid crystal layer. The lower polarizer 123 is disposed in relation to the upper polarizer 223 so that the two polarizers constitute crossed Nicol prisms, i.e., being disposed to rotate 90 degree with respect to the upper polarizer. Furthermore, to eliminate (compensate for) the influence of the upper λ/4 plate 220, the lower λ/4 plate 120 also is disposed to rotate 90 degree with respect to the upper one. Since the liquid crystal molecules are being rising up during application of voltage thereto and polarized light does not change its polarized state, the polarizers 123, 223 are disposed in a state optically equivalent to the configuration of crossed Nicol prisms, making light transmitting through the liquid crystal layer display a black color during application of voltage to the liquid crystal layer. Thus, the disposition of optical components constituting a semi-transmissive liquid crystal display device and the angular relationship between optical axes of the optical components are determined.

When the optical components are disposed maintaining the above-described angular relationship and the twist angle Φ of liquid crystal molecules is made to vary from 0 degree to 90 degree, the optimal film thickness dr of a liquid crystal layer in the reflective region 5 for making the reflectance to display a white color maximized and the optimal film thickness df of a liquid crystal layer in the transmissive region 6 for making transmittance to display a white color maximized are measured and shown in FIG. 5. As shown in FIG. 5, the optimal film thickness dr of a liquid crystal layer in the reflective region 5 and the optimal film thickness df of a liquid crystal layer in the transmissive region 6 coincide with each other at a twist angle=72 degree and the optimal film thickness dr in the reflective region becomes smaller than the optimal film thickness in the transmissive region in proportion to the decrease in the twist angle of liquid crystal molecules. For example, in a case where a nematic liquid crystal having a birefringence of 0.086 (Δn=0.086) is employed to forma liquid crystal, when a twist angle is set at 72 degree, the optimal film thickness df of a liquid crystal layer in the transmissive region and the optimal film thickness dr of a liquid crystal layer in the reflective region each are 2.7 μm (micrometers) and when a twist angle is set at 0 degree, the optimal film thickness df of a liquid crystal layer in the transmissive region is 2.9 μm and the optimal film thickness dr of a liquid crystal layer in the reflective region is 1.5 μm.

(2) Condition for Effectively Reflecting Light in a Direction Normal to the Surface of Reflector.

FIG. 6A schematically illustrates how incident light Li incident on the reflector 32 is reflected as reflected light Lr by the same and the light Lr is viewed by a viewer. Assume that an angle between the incident light Li and the direction normal to the surface of reflector and an angle between the reflected light Lr and the direction normal to the same are respectively referred to an incident angle Ti and a reflected angle Tr. Since the incident light Li is reflected by a reflective electrode 35 formed to have a concave-convex profile that follows the profile of a later described projection pattern 33 and second insulation film 34 shown n FIG. 8B, the incident angle Ti and the reflected angle Tr are different from one another.

FIG. 6B is a diagram schematically illustrating how light incident on a point A of the reflective electrode 35 having a concave-convex profile is reflected by the same and showing only a surface profile of the reflective electrode 35 and the reflector 32 for simplicity.

When the incident light Li enters the point A of the reflective electrode 35 having a concave-convex profile, the incident light Li is reflected at the point A by the tangent plane, meaning that the incident light Li is reflected as the reflected light Lr in a direction symmetrical to the normal to the tangent plane at the point A.

It should be noted that when assuming an angle, formed at the point A, between the tangent plane at the point A of the reflective electrode 35 and the reflector 32 is defined as a tilted angle .theta., distribution of reflected directions of the reflected light Lr varies depending on the distribution of the tilted angle .theta. at which the concave-convex of the reflective electrode 35 is tilted to a surface of the reflector 32. This indicates that based on estimation made by a viewer P who subjectively evaluates a brightness given by the reflector 32, a designer needs to design the reflective electrode so that the viewer P is able to feel the reflected light bright when viewing the reflective electrode that is formed reflecting distribution of the tilted angle .theta. at which the surface of the reflective electrode 35 is tilted to a surface of the reflector 32.

It would primarily appear that the viewer P views a reflective liquid crystal display device or a semi-transmissive liquid crystal display device under the following environment. As shown in FIG. 7A, the viewer P views reflected light Lr in a direction ranging from −10 degree to +20 degree relative to the direction normal to the reflector 32 after the incident light Li from a light source S disposed ranging from 0 degree to −60 degree is relative to the same is reflected by the reflector 32. As shown in FIG. 7B, the viewer P views reflected light Lr in a direction ranging from −20 degree to +20 degree relative to the direction normal to the point A of the reflector 32 after incident light Li from a direction ranging from −20 degree to +20 degree is reflected by the reflector 32.

Making many concave-convex portions, which extends in a horizontal direction when viewed by the viewer P, included in the concave-convex pattern formed in the reflector 32 allows a designer to design the reflector 32 having a directivity of reflection, which directivity is observed when the incident light Li from the light source S is effectively reflected as the reflected light Lr toward the viewer P.

FIG. 8A is a plan view of the concave-convex pattern formed in the reflector 32. A cross-hatch portion in the figure is a region in which a convex pattern 33 is formed and a region indicated by open triangles is a region in which a concave portion is formed. As shown in FIG. 8A, although triangles indicating the concave portion are arrayed in an orderly fashion, the triangles actually are disposed in a fairly random fashion. Although a liquid crystal display device is exemplified in which three sides of each of multiple triangles are defined by the convex pattern 33, a liquid crystal display device may be exemplified in which the convex is patterned to define rectangles or ellipses (enclosed figures) enclosed by a linear convex pattern to thereby form a concave-convex pattern.

FIG. 8B is a schematic cross sectional view taken along line X–X' shown in FIG. 8A. Assume that a distance between centers of the linear portions of the convex pattern 33 in a width direction, those linear portions being determined so as to interpose a rectangle therebetween while substantially penetrating the center of the triangle, is L, a width of the convex pattern 33 is W, a height of the convex pattern 33 is D, a minimum height of a second insulation film 34 is "d," a difference between a maximum height of the second insulation film 34 and the minimum height thereof is ΔD representing a height of the step of the concave-convex of the reflective electrode. Since the film thickness of an aluminum film (the reflective electrode 35) coated on an upper surface of the second insulation film 34 is thin, the aluminum film is drawn as a line in the figure for simplicity as a result of ignorance of thickness of the aluminum film.

Referring to FIG. 7A, it is required to determine the surface profile of the reflective electrode to increase reflectance in a reflected angle ranging from 0 degree to 10 degree. The surface profile of the reflective electrode is approximately determined by ΔD representing a height of the step of the concave-convex of the reflective electrode 35 and the a distance between centers of the linear portions of the convex pattern 33 (a first insulation film) in a width direction, both being shown in FIG. 8B.

Recently, a liquid crystal display device has been required to display an image with high precision. In addition, a semi-transmissive liquid crystal display device is becoming the prevalent display device employed in a portable equipment such as a portable telephone, reflecting the need for a bright screen of display device. As a liquid crystal display device provides a higher precision image and is supplied more frequently as a semi-transmissive one, the number of triangles (concave portions) included within a pixel decreases. Accordingly, a problem arises in that reflected lights interfere with each other. This is because decreasing the number of triangles included in a pixel makes it difficult to eliminate interference between reflected lights within the pixel. For this reason, the distance L between centers of the linear portions of the convex pattern (first insulation film) 33 in a width direction needs to be as small as possible. However, currently the distance L is forcibly made ranging from 60 to 80 $\mu$m since the distance is determined by manufacturing capability such as exposure accuracy. As a result, the surface profile of the reflective electrode is approximately determined by the ΔD representing a height of the step of the concave-convex of the reflective electrode 35.

What the market mainly demands from a semi-transmissive liquid crystal display device is displaying a bright image and in order to display the bright image, the liquid crystal display device has to satisfy the following conditions: (1) in accordance with the twist angle of liquid crystal molecules, the optimal film thickness dr of a liquid crystal layer in the reflective region 5 for making the reflectance to display a white color maximized and the optimal film thickness df of a liquid crystal layer in the transmissive region 6 for making transmittance to display a white color maximized need to be determined as shown in FIG. 5; (2) the optimal surface profile of the reflective electrode needs to be determined so as to effectively reflect lights incident thereon in a direction normal to the reflector.

SUMMARY OF THE INVENTION

It is an objective of the present invention to provide a liquid crystal display device that satisfies the above conditions and maximizes the brightness in both the reflective region and the transmissive region and to provide a method for manufacturing such a liquid crystal display device.

In order to achieve the above objective, a liquid crystal display device of the present invention includes: a plurality of pixel electrodes formed on a first substrate, each of the pixel electrodes having a reflective electrode constituting a reflective region and a transparent electrode constituting a transmissive region; an insulation film for reflection interposed between the reflective electrode and the first substrate; a second substrate disposed in opposition to the first substrate; a color layer for reflection formed on the second substrate and disposed at a location corresponding to the reflective region; a color layer for transmission formed on the second substrate and disposed at a location corresponding to the transmissive region; a common electrode formed so as to cover the color layer for reflection and the color layer for transmission; and a liquid crystal layer interposed between the first substrate and the second substrate, The liquid crystal display device thus configured is further constructed such that a thickness of liquid crystal layer corresponding to the reflective region and a thickness of liquid crystal layer corresponding to the transmissive region are made to maximize a reflectance in the reflective region and a transmittance in the transmissive region with respect to individual twist angles of liquid crystal molecules.

A method for manufacturing a liquid crystal display device constructed in accordance with the present invention includes: forming a plurality of wiring lines intersecting one another and wired longitudinally and laterally on a first substrate while partitioning a display area into a plurality of pixels on the first substrate; forming on the first substrate a first insulation film covering the plurality of wiring lines and the plurality of pixels; defining in each of the plurality of pixels a reflective region for reflecting light from a display face and a transmissive region for allowing light from a back light positioned opposite the plurality of pixels with reference to the first substrate, and then, forming an insulation film for reflection corresponding to the reflective region on the first insulation film; forming a reflective electrode on the insulation film for reflection; forming on the first insulation film a transparent electrode corresponding to the transmissive region; forming on the second substrate a color layer for reflection and a color layer for transmission so as to correspond to the reflective region and the transmissive region, respectively;

forming a common electrode so as to cover the color layer for reflection and the color layer for transmission;

disposing the second substrate in opposition to the first substrate; and interposing a liquid crystal layer between the first substrate and the second substrate.

The method thus configured is further constructed such that thicknesses of the liquid crystal layer corresponding to the reflective region and the transmissive region are different from each other, and a thickness of a liquid crystal layer interposed between a surface of the reflective electrode and a surface of the color layer for reflection and a thickness of a liquid crystal layer interposed between a surface of the transparent electrode and a surface of the color layer for transmission are made to maximize a reflectance in the reflective region and a transmittance in the transmissive region with respect to individual twist angles of liquid crystal molecules.

Therefore, the liquid crystal display device of the present invention comes to have advantages as follows. That is, the heights of the surfaces of the reflective electrode and the transmissive electrode and the film thickness of the color layer for reflection and the color layer for transmission are determined so that the thicknesses dr and df of the liquid crystal layer respectively in the reflective region and the transmissive region allow the reflectance and the transmittance of the device for white display to be maximized. As a result, the extent to which the freedom of determination of the thicknesses of the liquid crystal layer in the reflective region and that in the transmissive region increases.

DETAILED DESCRIPTION OF THE PREFERRED EMBODIMENTS

Preferred embodiments of the present invention will be explained with reference to the accompanying drawings. A liquid crystal display device of each of the embodiments is constructed such that a transmissive region and a reflective region are provided in a pixel electrode to make the device operate as a reflective liquid crystal display device while turning off a backlight when the surroundings are bright and to make the device operate as a transmissive liquid crystal display device while turning on a backlight when the surroundings are dark.

(Embodiment 1)

Figure 9:
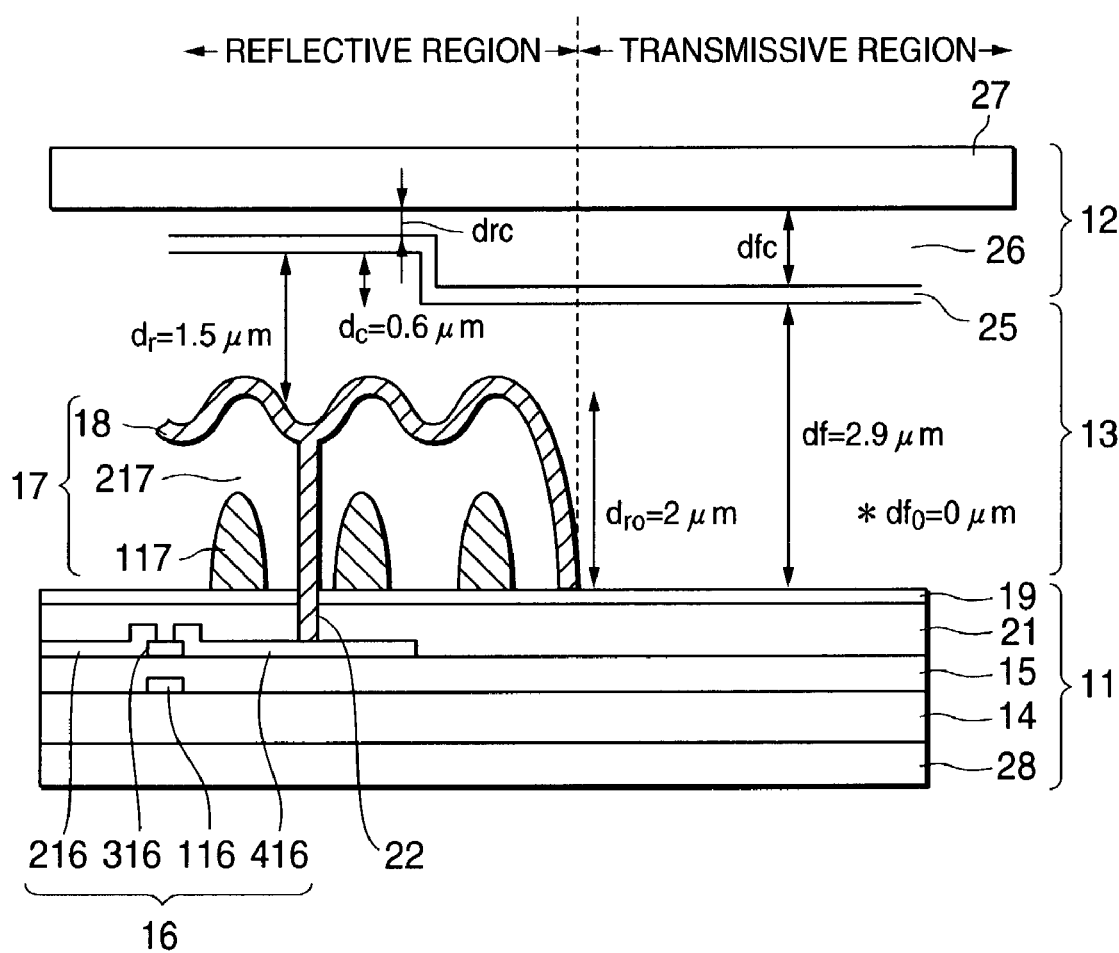
FIG. 9 is a partial cross-sectional view of a semi-transmissive LCD device in Embodiment 1.

FIG. 9 is a partial cross sectional view of a semi-transmissive liquid crystal display device of an embodiment 1 of the present invention and illustrating the configuration of the device in a case of a twist angle=0 degree. As shown in FIG. 9, the semi-transmissive liquid crystal display device comprises a TFT substrate 11, an opposing substrate 12 disposed opposite the TFT substrate 11, a liquid crystal layer 13 interposed between the TFT substrate 11 and the opposing substrate 12. The semi-transmissive liquid crystal display device has, for example, a thin film transistor as a switching element formed in each pixel, which configuration is called an active matrix liquid crystal display device.

The TFT substrate 11 includes an insulating substrate 14, an insulating protective film 15, a passivation film 21, an organic insulation film for reflection 17, a reflective electrode 18 and a transparent electrode 19. On the insulating substrate 14 is laminated the insulating protective film 15 and on the insulating protective film 15 is formed the TFT 16. The TFT 16 comprises: a gate electrode 116 formed on the insulating substrate 14; the insulating protective film 15 covering the gate electrode 116; and a drain electrode 216, a semiconductor layer 316 and a source electrode 416 formed on the insulating protective film 15. The drain electrode 216, the semiconductor layer 316 and the source electrode 416 are covered by the passivation film 21, and the transparent electrode 19 is formed on the passivation film 21.

Each display cell includes a reflective region 5 and a transmissive region 6. In the reflective region 5 are formed a first organic insulation film for reflection 117 and a second organic insulation film for reflection 217. In the second organic insulation film for reflection 217 is formed a contact hole reaching the source electrode 416 of the TFT 16. Furthermore, the reflective electrode 18 is formed to cover the second organic insulation film for reflection 217 along with the contact hole 22. The reflective electrode 18 and the transparent electrode 19 are connected to the source electrode 416 of the TFT 16 via the contact hole 22, thereby serving as a pixel electrode. In this case, the reflective electrode 18 also serves as a reflector.

An alignment film (not shown), made of polyimide, for aligning liquid crystal molecules is formed covering the reflective electrode 18 and the transparent electrode 19 and the alignment layer rubbed determines alignment directions of liquid crystal molecules. Also a surface of the opposing substrate 12 facing the liquid crystal layer 13 is covered by an alignment film (not shown).

The opposing substrate 12 includes an insulating substrate 27, a color layer 26 formed on the insulating substrate 27 and a transparent electrode 25 formed on the color layer 26 and facing the liquid crystal layer 13. A film thickness of the color layer in the reflective region is formed thicker by a thickness of dc than that of the color layer in the transmissive region. Note that a boundary between the regions having film thickness different from one another is made apart a little bit distance from a boundary between the reflective region 5 and the transmissive region 6, i.e., a boundary between the regions respectively provided for forming the reflective electrode 18 and the transparent electrode 6. This is because the disclination of liquid crystal molecules has to be reduced as large extent as possible.

Furthermore, a backlight 28 is provided on a side of the TFT substrate 11 opposite the liquid crystal layer 13. Light from the backlight 28 transmits through the transparent substrate 14, the insulating protective film 15, the passivation film 21 and the transparent electrode 19 in the transmissive region 2 to reach the liquid crystal layer 13 and then, passes through the liquid crystal layer 13 and the transparent electrode 25 to thereby exit to the outside of the opposing substrate 12.

Figure 5:
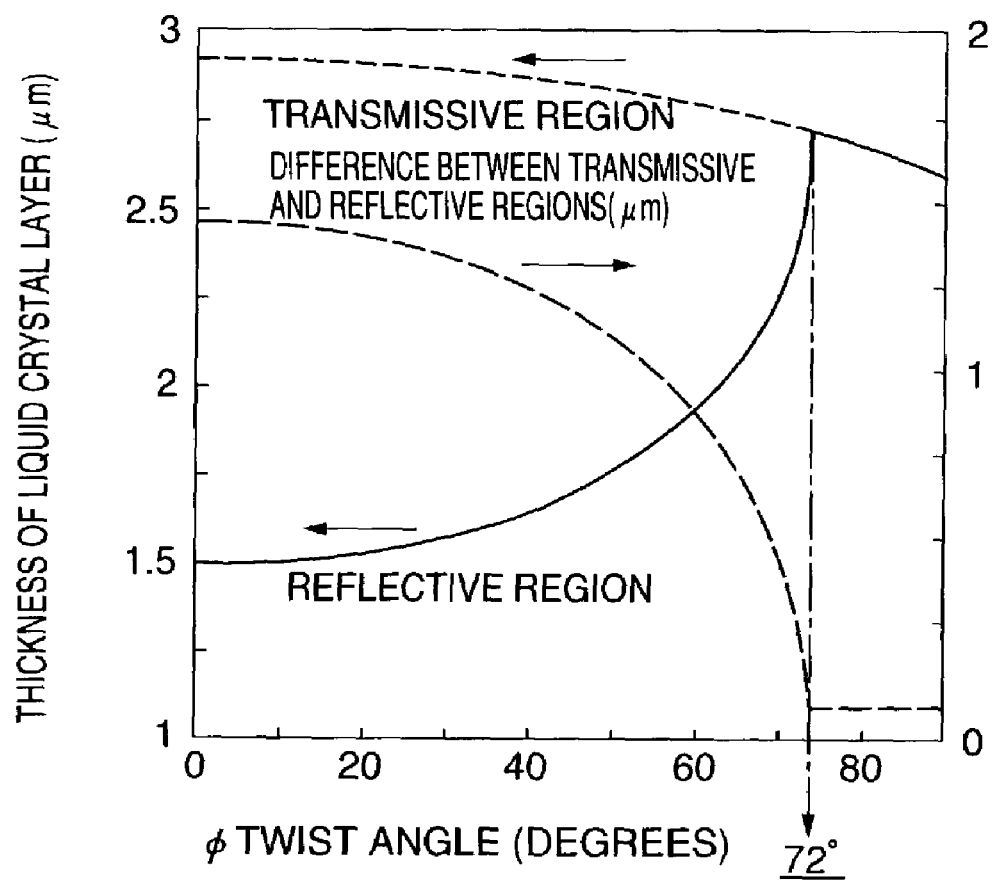
FIG. 5 is a graph illustrating a relationship between twist angles of the liquid crystal and the thickness of the liquid crystal layer for maximizing the reflectance and the transmittance.
Figure 6A:
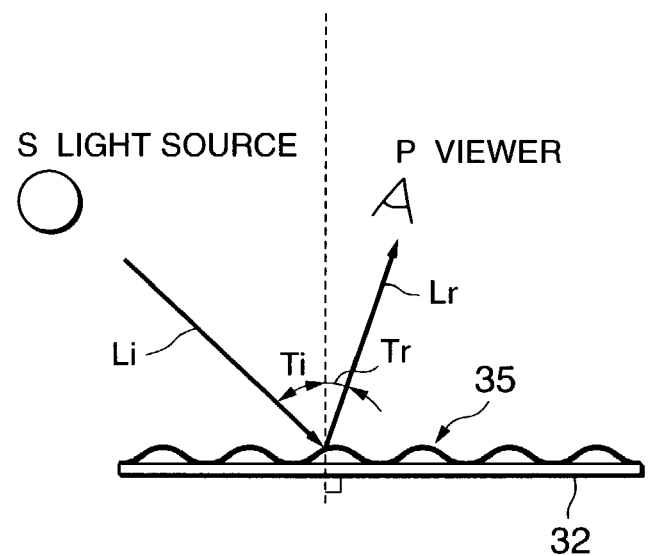
FIG. 6A is a schematic view illustrating a relationship between the incident light and the emitted light.
Figure 6B:
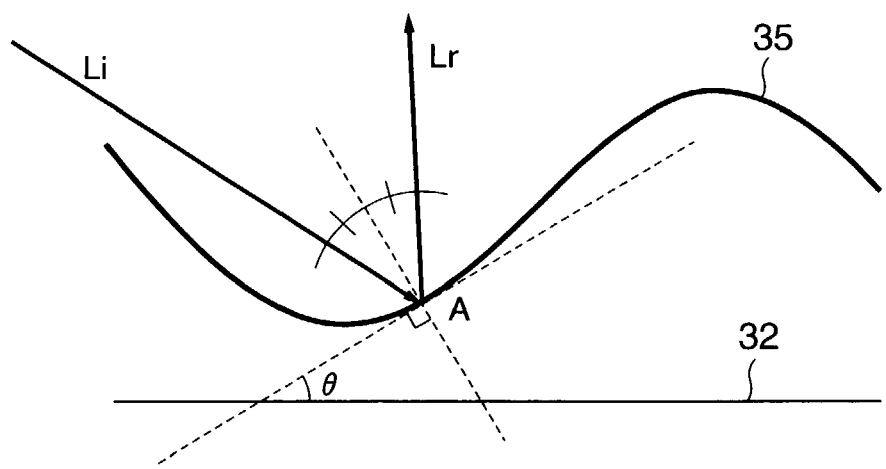
FIG. 6B is a schematic view illustrating a relationship between the incident light and the emitted light with the reflective electrode being magnified.

Referring again to FIG. 5, when a twist angle is set at 0 degree, the optimal film thickness df of a liquid crystal layer in the transmissive region is 2.9 $\mu$m and the optimal film thickness dr of a liquid crystal layer in the reflective region is 1.5 $\mu$m. This configuration can be realized by setting a film thickness dr0 of the organic insulation film for reflection, i.e., a laminated film consisting of the first organic insulation film for reflection 117 and the second organic insulation film for reflection 217, to be 2 $\mu$m and a film thickness df0 of the organic insulation film for transmission to be 0 $\mu$m, and then, making a film thickness of the color layer for reflection thinner by 0.6 $\mu$m than that of the color layer for transmission, and further, appropriately determining a gap between the insulating substrates 14 and 27. In this case, the film thickness of the organic insulation film for reflection as a laminated film having a concave-convex formed in the surface portion thereof is assumed an average film thickness.

A method for manufacturing the TFT substrate 11 and the opposing substrate 12 of the semi-transmissive liquid crystal display device shown in FIG. 9 will be explained below.

FIGS. 10A to 10E are cross sectional views of the TFT substrate 11 of the semi-transmissive liquid crystal display device shown in FIG. 9, illustrating manufacturing steps of the TFT substrate.

First, on an insulating substrate 14 is formed a gate electrode 116 and then, is deposited an insulating protective film 15. On the insulating protective film 15 are formed a drain electrode 216, a semiconductor layer 316 and a source electrode 416 to thereby form a TFT 16 as a switching element. A passivation film 21 is formed to cover the TFT 16 and a transparent electrode 19 is formed on the passivation film 21 (refer to FIG. 10A).

Figure 10A:
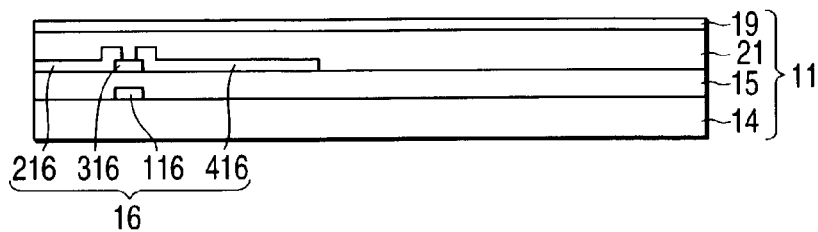
FIGS. 10A to 10E are cross-sectional views illustrating a process of manufacturing the first substrate in Embodiment 1.
Figure 10B:
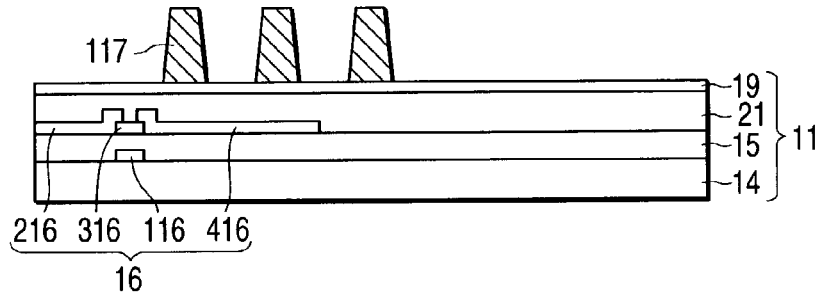
Figure 10C:
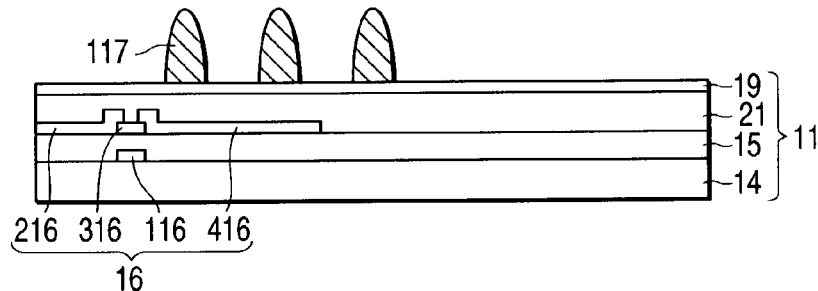
Figure 10D:
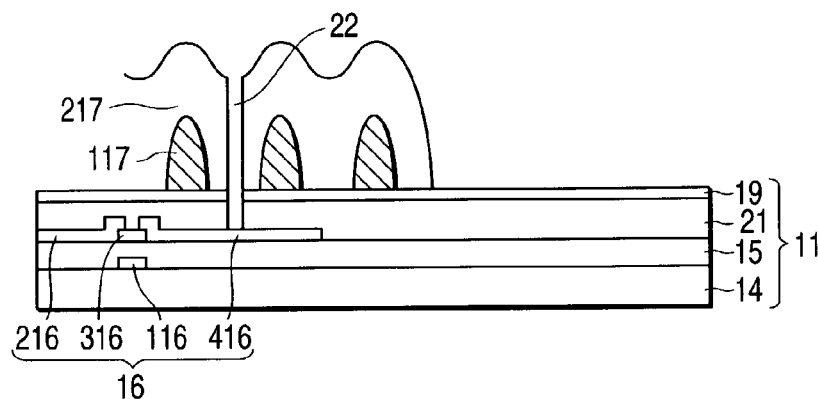
Figure 10E:
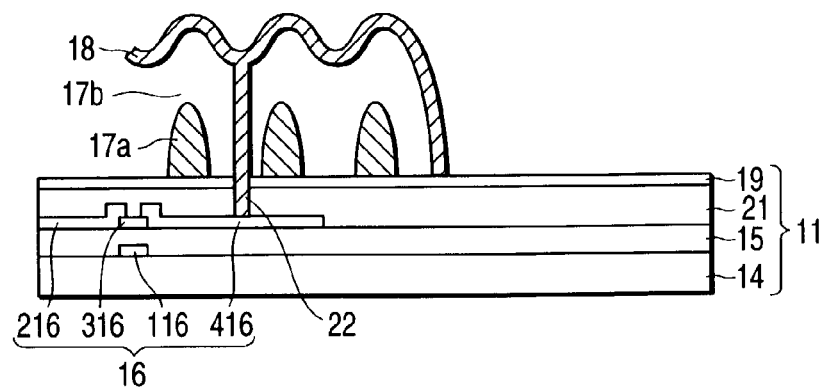

After coating an organic resin film on the transparent electrode 19, the organic resin film is exposed using a mask for forming a convex pattern and developed to form a first organic insulation film for reflection 117 having the convex pattern in a reflective region 5 (refer to FIG. 10B). The first organic insulation film for reflection 117 is made of an acrylic resin, i.e., PC415G (15 CP) available from Nippon Synthetic Chemical Industry Co., Ltd. In this case, the first organic insulation film for reflection 117 is not formed in a transmissive region 6.

The first organic insulation film for reflection 117 is sintered for one hour at a temperature of 230.degree. C. to round corner portions of the organic resin (refer to FIG. 10C).

Second, an insulation film made of an organic resin is coated on the first organic insulation film for reflection 117 to have a smooth concave-convex profile and a portion of the insulation film corresponding to the transmissive region is removed by exposing and developing the insulation film. The insulation film is made of an acrylic resin, i.e., PC405G (5–10 CP) available from Nippon Synthetic Chemical Industry Co., Ltd. Then, the insulation film is sintered to constitute a second organic insulation film for reflection 217. The sintering is performed for one hour at a temperature of 230.degree. C. Furthermore, a contact hole 22 is formed penetrating the second organic insulation film for reflection 217 to reach the source electrode 416 (refer to FIG. 10D).

Thereafter, molybdenum (Mo) as a barrier metal and aluminum (Al) as a reflective metal each are sequentially deposited to a film thickness of 100 nm, preferably, not less than 200 nm. Furthermore, aluminum and molybdenum in the transmissive region 6 are removed together by wet etching to form a reflective electrode 18 in the reflective region 5 (refer to FIG. 10E).

It should be noted that film thicknesses of the first organic insulation film for reflection 117 and the second organic insulation film for reflection 217 can be controlled by a film thickness of an organic resin to be coated.

As already described, light travels different distances in the liquid crystal layer respectively when transmitting through the transmissive region 6 and when being incident on and reflected by the reflective region 5. Likewise, light travels different distances in the color layer respectively when transmitting through the transmissive region 6 and when being incident on and reflected by the reflective region 5. In more detail, since light incident on the reflective region travels forward and backward through a corresponding color layer, i.e., two times therethrough, and light incident through the transmissive region travels one time through a corresponding color layer, it is necessary to form color layers respectively for transmissive region and reflective region so as to correspond to individual colors, thereby making color reproduction ranges of the reflective and transmissive regions coincide with each other. This configuration can be realized by employing a color layer made of resins different in the transmissive and reflective regions or having film thicknesses different in the transmissive and reflective regions, or a color layer made of resins and having film thicknesses, both different in the transmissive and reflective regions. Japanese Patent Application Laid-open No. 12(2000)-267081 discloses a technique for making color reproduction ranges of the reflective and transmissive regions coincide with each other by setting the film thickness of the color layer in the reflective region to be half the film thickness of the color layer in the transmissive region. The liquid crystal display device of the present invention is configured to adjust physical parameters including the film thickness of color layer to maximize both reflectance and transmittance of the device and to adjust the film thickness of color layer and select a material constituting a color layer to optimize color reproduction range of the device. A method for manufacturing the opposing substrate 12 will be explained below highlighting the steps of forming a color layer.

FIGS. 11A to 11D are cross sectional views of the opposing substrate 12 of the semi-transmissive liquid crystal display device shown in FIG. 9, illustrating manufacturing steps of the opposing substrate.

Figure 11A:
FIGS. 11A to 11D are cross-sectional views illustrating a process of manufacturing the second substrate in Embodiment 1.
Figure 11B:
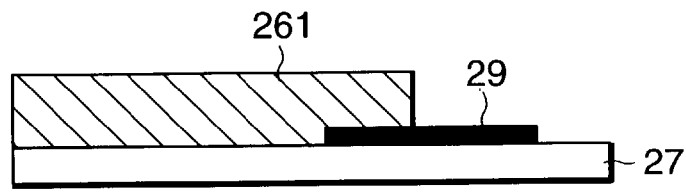
Figure 11C:
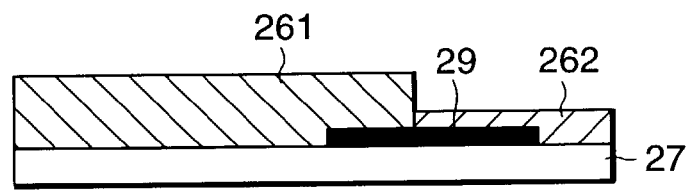
Figure 11D:
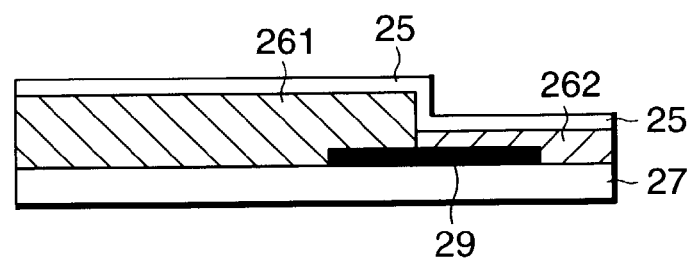

First, a light shielding film is formed over an insulating substrate 27 constituting the opposing substrate 12 and is patterned to define a light shielding layer 29 in the vicinity of a boundary between the reflective region 5 and the transmissive region 6 (refer to FIG. 11A). Then, a resin layer is formed over the insulating substrate 27 to form a red color layer in the transmissive region and is patterned to define a red color layer 261 in the transmissive region 6 (refer to FIG. 11B). Subsequently, a resin layer is formed over the insulating substrate 27 to form a red color layer in the reflective region and is patterned to define a red color layer 262 in the reflective region 5 (refer to FIG. 11C).

Similarly, a green colored resin layer in the transmissive region, a green colored resin layer in the reflective region, a blue colored resin layer in the transmissive region and a blue colored resin layer in the reflective region are formed, and ITO 25 is formed over the insulating substrate 27 by a sputtering method. Film thicknesses of the individual resin layers can be adjusted by changing the film thickness of the corresponding resin layer. Thus, the color layers made of resin layers different from one another and having film thicknesses different from one another can be formed to correspond to the individual colors and the individual regions. Forming the light shielding layer 29 in the vicinity of the boundary between the reflective region 5 and the transmissive region 6, both regions being provided to correspond to each color, prevents light leakage through a region on which any color layer does not reside even in a case where such a region is formed in the boundary between the reflective region 5 and the transmissive region 6 as a result of variation in operation for patterning a resin layer to define a color layer. The semi-transmissive liquid crystal display device of the present invention may be configured to have the light shielding layer 29 formed only in the vicinity of the boundary between the reflective region and the transmissive region of a pixel (in the present invention, pixels representing colors different from one another each are handled as an independent pixel). This is because a semi-transmissive liquid crystal display device generally does not have a light shielding layer between pixels in order to give preference to a display brightness over other demands on the device.

Figure 12A:
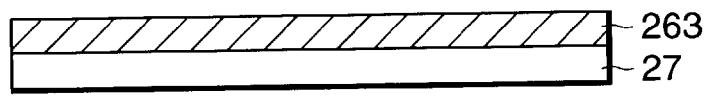
FIGS. 12A to 12C are cross-sectional views illustrating another process of manufacturing the second substrate in Embodiment 1.
Figure 12B:
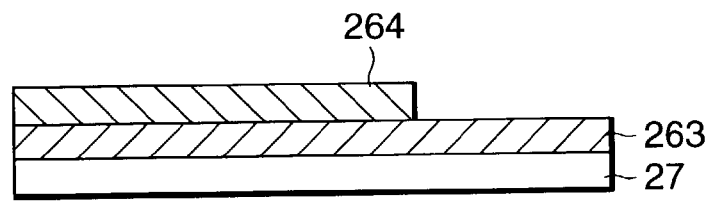
Figure 12C:
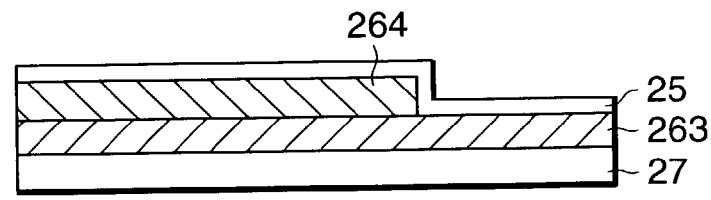

FIGS. 12A to 12C are cross sectional views of the opposing substrate 12 of the semi-transmissive liquid crystal display device, illustrating another manufacturing steps of the opposing substrate.

First, a red colored first resin layer is formed over an insulating substrate 27 constituting the opposing substrate 12 and is patterned to define a first red color layer 263 in the reflective region 5 and the transmissive region 6 (refer to FIG. 12A). Then, a red colored second resin layer is formed over the insulating substrate 27 and is patterned to define a second red color layer 264 in the transmissive region 6 (refer to FIG. 12B). Thus, the first red color layer 263 is formed in the reflective region 5 corresponding to red color, and a laminated film consisting of the first red color layer 263 and the second red color layer 264 is formed in the transmissive region 6 corresponding to red color. Accordingly, coloring of the transmissive region corresponding red color is determined by the first red color layer 263 and the second red color layer 264. Similarly, a green colored resin layer in the transmissive region, a green colored resin layer in the reflective region, a blue colored resin layer in the transmissive region and a blue colored resin layer in the reflective region are formed, and then, ITO 25 is formed over the insulating substrate 27 by a sputtering method. Film thicknesses of the individual resin layers can be adjusted by changing the film thickness of the corresponding resin layer.

Figure 13A:
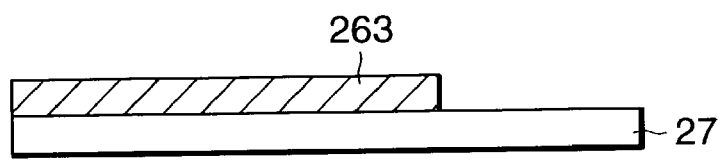
FIGS. 13A to 13C are cross-sectional views illustrating yet another process of manufacturing the second substrate in Embodiment 1.
Figure 13B:
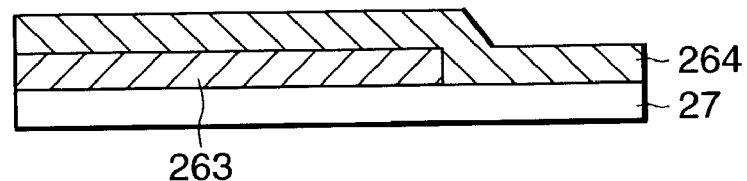
Figure 13C:
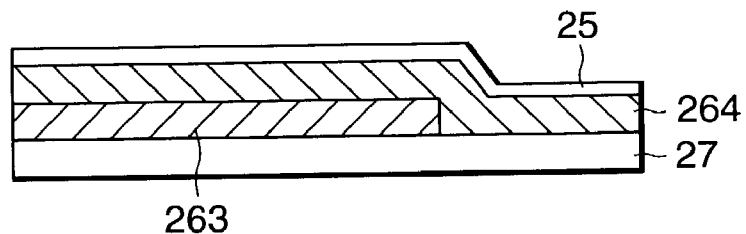

FIGS. 13A to 13C are cross sectional views of the opposing substrate 12 of the semi-transmissive liquid crystal display device, illustrating still another manufacturing steps of the opposing substrate.

First, for example, a red colored first resin layer is formed over an insulating substrate 27 and is patterned to define a first red color layer 263 in the transmissive region 6 corresponding to red color (refer to FIG. 13A). Then, a red colored second resin layer is formed over the insulating substrate 27 and is patterned to define a second red color layer 264 in both the transmissive region 6 and the reflective region 5 corresponding to red color (refer to FIG. 13B). Thus, a laminated film consisting of the first red color layer 263 and the second red color layer 264 is formed in the transmissive region 6 corresponding to red color and a second red color layer 264 is formed in the reflective region 5 corresponding to red color. Accordingly, coloring of the transmissive region 6 corresponding red color is determined by the first red color layer 263 and the second red color layer 264. Similarly, a green colored resin layer in the transmissive region, a green colored resin layer in the reflective region, a blue colored resin layer in the transmissive region and a blue colored resin layer in the reflective region are formed, and then, ITO 25 is formed over the insulating substrate 27 by a sputtering method. Film thicknesses of the individual resin layers can be adjusted by changing the film thickness of the corresponding resin layer.

Although the opposing substrate is manufactured in accordance with the manufacturing steps shown in FIGS. 12A to 12C and FIGS. 13A to 13C and does not include a light shielding layer, the opposing substrate may have a light shielding layer formed therein. However, even in a case where a light shielding layer is not formed in the opposing substrate, a region located at the boundary between the reflective region and the transmissive region and not having any color layer thereon is never formed as a result of variation in operation for patterning a resin layer to define a color layer.

(Embodiment 2)

Figure 14:
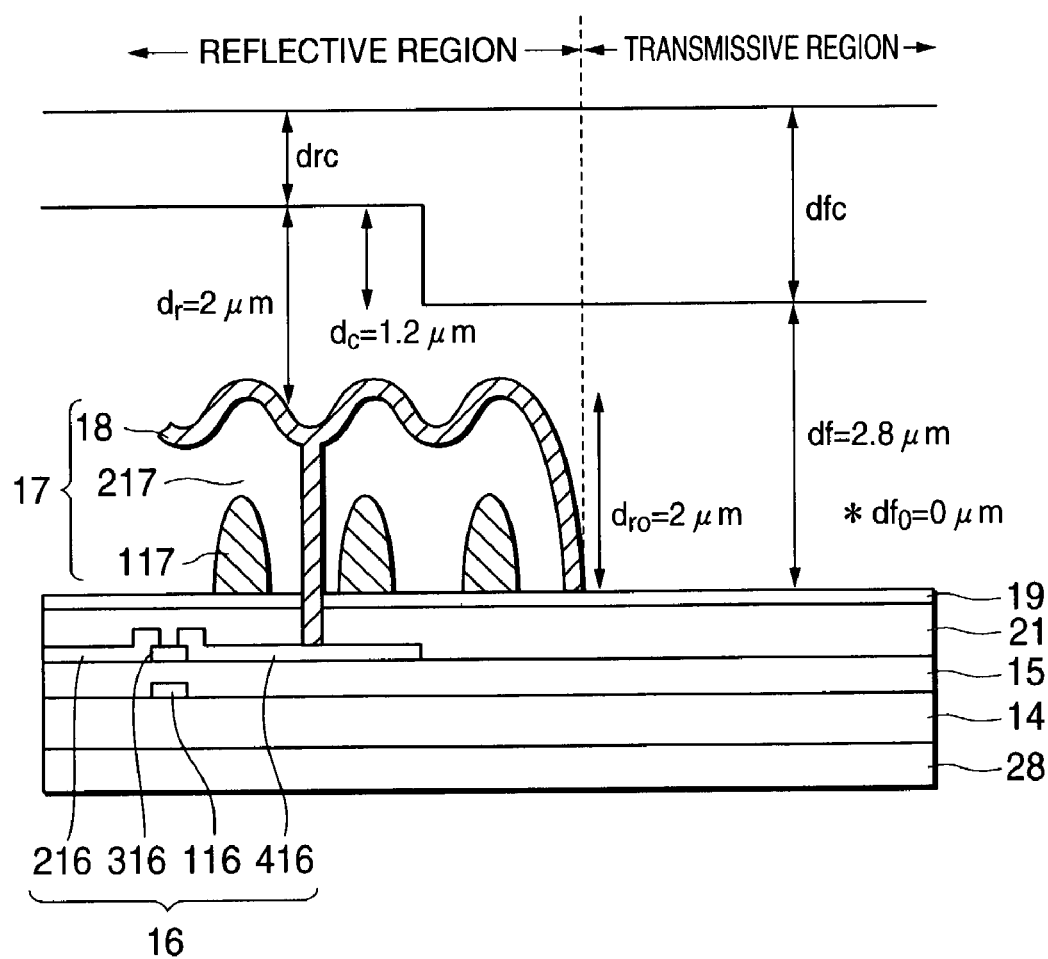
FIG. 14 is a partial cross-sectional view of a semi-transmissive LCD device in Embodiment 2.

FIG. 14 is a partial cross sectional view of a semi-transmissive liquid crystal display device of an embodiment 2 of the present invention and illustrating the configuration of the device in a case of a twist angle=60 degree. As is the case with the embodiment 1 explained referring to FIG. 9, the semi-transmissive liquid crystal display device of the embodiment comprises a TFT substrate 11, an opposing substrate 12 disposed opposite the TFT substrate 11, a liquid crystal layer 13 interposed between the TFT substrate 11 and the opposing substrate 12, and further, a reflective region 5 and a transmissive region 6 are defined in each display cell (i.e., each pixel) of the device. The configuration shown in FIG. 14 is different from that shown in FIG. 9 in that in accordance with the optimal thickness of liquid crystal layer shown in FIG. 5, the film thickness dr of a liquid crystal layer in the reflective region 5 is set to be 2.0 μm and the film thickness df of a liquid crystal layer in the transmissive region 6 is set to be 2.8 μm. Additionally, in order to set the thicknesses of liquid crystal layer to be the above-stated values, the film thickness of a color layer in the reflective region 5 is made thinner by 1.2 μm than the film thickness of a color layer in the transmissive region 6. The manufacturing steps of the TFT substrate 11 and the opposing substrate 12 are the same as those explained in the description of FIGS. 10A to 10E and FIGS. 11A to 11D, and therefore, explanation thereof is omitted.

It should be noted that although transmittance of the device in a case of liquid crystal molecules twisted at an angle of 60 degree decreases to a larger extent than that observed in a case of liquid crystal molecules twisted at an angle of 0 degree, and concretely, down to 50 to 75%, the presence of black increases the viewing contrast from the display of the device having such transmittance. Furthermore, even when a display face of the device is viewed from a position inclined relative to the direction normal to the display face, the refractive anisotropy of liquid crystal molecules is compensated and color shift is made small since the liquid crystal molecules on the surfaces of the TFT substrate and the opposing substrate are twisted to a certain angle relative to each other. On the other hand, in a case of liquid crystal molecules twisted at an angle of 0 degree, high transmittance, i.e., 100% transmittance, is achieved in the device. However, the presence of black decreases the viewing contrast from the display of the device having such transmittance and further, color shift is made large.

(Embodiment 3)

An embodiment 3 of the present invention employs the same configuration of liquid crystal molecules, i.e., twisted at an angle of 60 degree, as that in the embodiment 2. However, in the embodiment 3, difference between film thicknesses of color layers in the reflective region 5 and the transmissive region 6 is reduced to 0.5 μm by forming an organic insulation film for transmission to have a film thickness of 1.7 μm in the transmissive region. When difference between film thicknesses of color layers in the reflective region 5 and the transmissive region 6 is increased to 1.2 μm and a step of color layers between the reflective region and the transmissive region is located at a position displaced on a side of the transmissive region 6, the thickness of a liquid crystal layer in the reflective region 5 becomes 0.8 μm and the thickness of a liquid crystal layer in the transmissive region 6 becomes 4.0 μm, thereby changing coloring of an image to be displayed through the liquid crystal layer having the thickness of 4.0 μm. Accordingly, reducing difference between film thicknesses of color layers in the reflective region and the transmissive region makes it possible to suppress change of coloring of image to display a favorable image on the display of the device.

Figure 15:
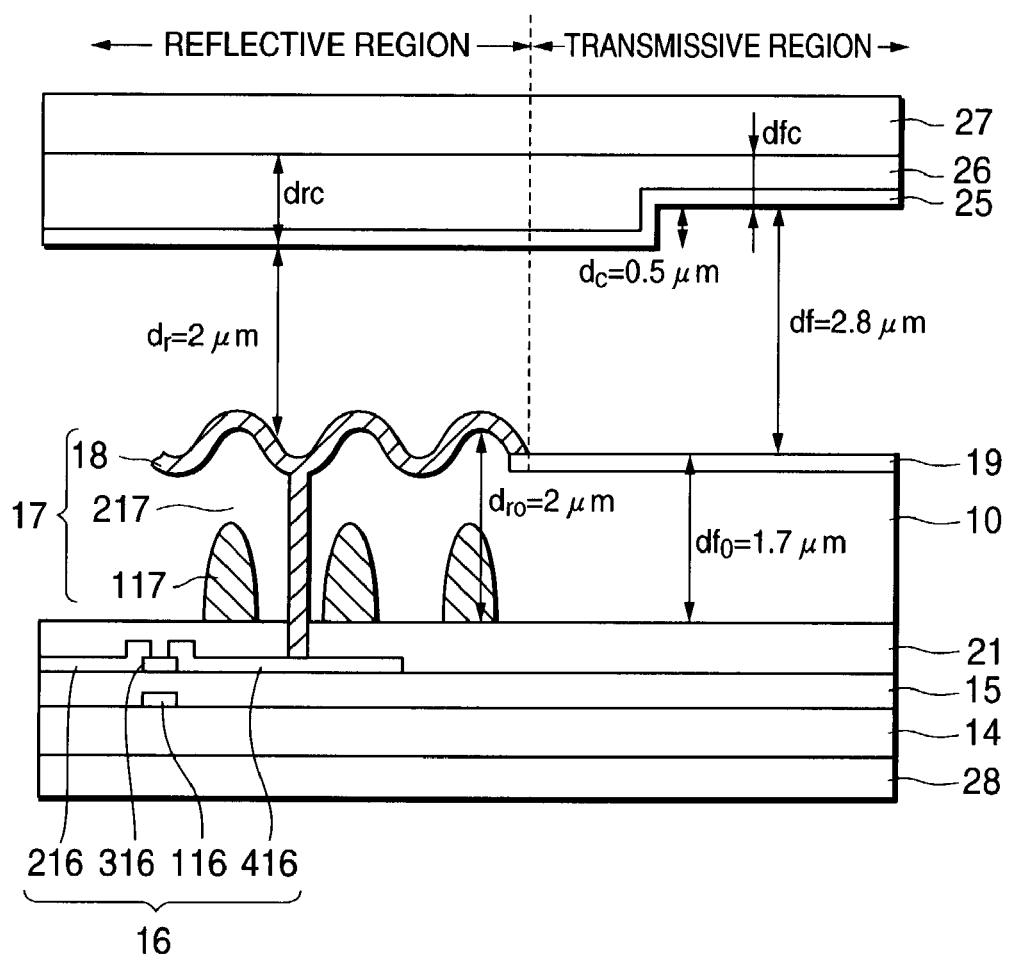
FIG. 15 is a partial cross-sectional view of a semi-transmissive LCD device in Embodiment 3.
Figure 16A:
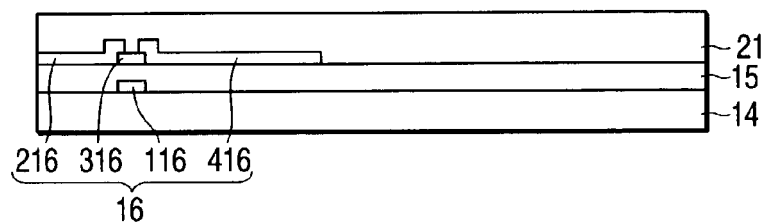
FIGS. 16A to 16D are cross-sectional views illustrating a process of manufacturing the first substrate in Embodiment 3.
Figure 16B:
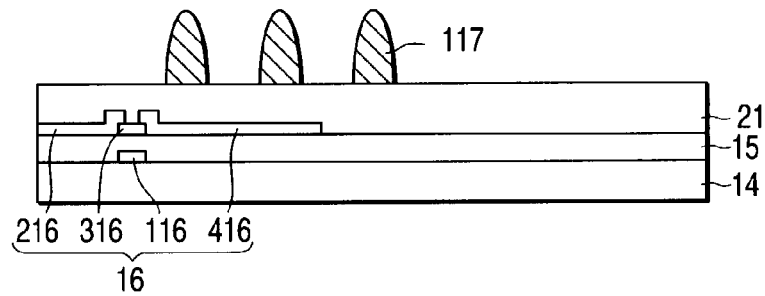
Figure 16C:
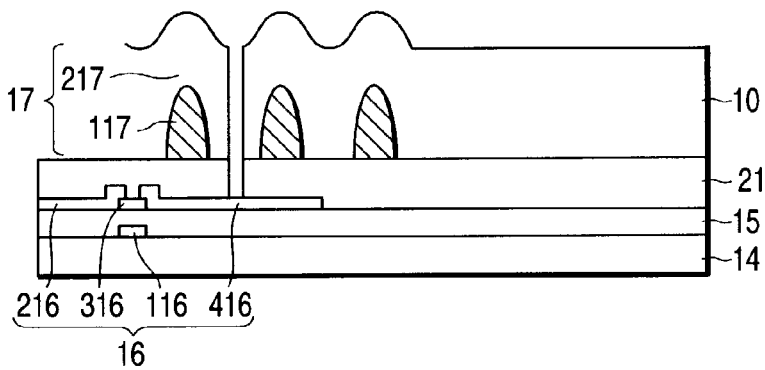
Figure 16D:
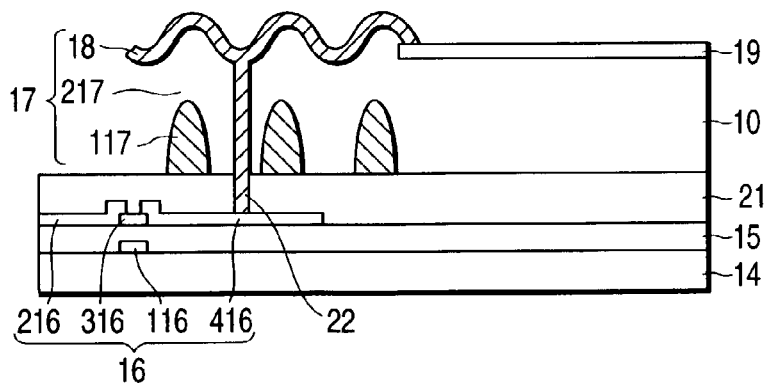

FIG. 15 is a partial cross sectional view of a semi-transmissive liquid crystal display device of the embodiment 3 of the present invention. As is the case with the embodiments 1, 2 explained referring respectively to FIG. 9 and FIG. 14, the semi-transmissive liquid crystal display device of the embodiment comprises a TFT substrate 11, an opposing substrate 12 disposed opposite the TFT substrate 11, a liquid crystal layer 13 interposed between the TFT substrate 11 and the opposing substrate 12, and further, a reflective region 5 and a transmissive region 6 are defined in each display cell of the device. Although the configuration of the embodiment 3 in which the film thickness dr of a liquid crystal layer in the reflective region 5 is set to be 2.0 μm and the film thickness df of a liquid crystal layer in the transmissive region 6 is set to be 2.8 μm is similar to that shown in FIG. 14. However, the configuration shown in FIG. 15 is different from that shown in FIG. 14 in that the film thickness df0 of an organic insulation film for transmission in the transmissive region 6 shown in FIG. 15 is set to be 1.7 μm whereas the film thickness df0 of an organic insulation film for transmission in the transmissive region 6 shown in FIG. 14 is set to be 0 μm. As is already mentioned, the embodiment 3 is configured to make the film thickness of a color layer in the reflective region 5 thicker by 0.5 μm than that in the transmissive region 6 to reduce difference between film thicknesses of color layers in the reflective region 5 and the transmissive region 6 to 0.5 μm.

FIGS. 16A to 16D are cross sectional views of the TFT substrate 11 of the semi-transmissive liquid crystal display device shown in FIG. 15, illustrating manufacturing steps of the TFT substrate 11.

First, on an insulating substrate 14 is formed a gate electrode 116 and then, is deposited an insulating protective film 15. On the insulating protective film 15 are formed a drain electrode 216, a semiconductor layer 316 and a source electrode 416 to thereby form a TFT 16 as a switching element. A passivation film 21 is formed to cover the TFT 16 (refer to FIG. 16A). After this step, a transparent electrode is not formed on the passivation film 21, which configuration is different from that shown in FIG. 10A. In accordance with the step similar to that shown in FIG. 10B, a first organic insulation film for reflection 117 is formed on the passivation film 21 in the reflective region 5 and is sintered to round corner portions of the organic insulation film (refer to FIG.

16B). Second, an insulation film made of an organic resin is coated to cover the first organic insulation film for reflection 117 and the passivation film 21 in the transmissive region 6 to have a smooth concave-convex profile in the reflective region 5 and then, is exposed and developed. Thereafter, the insulation film is sintered to constitute a second organic insulation film for reflection 217 and an organic insulation film for transmission 10. Furthermore, a contact hole 22 is formed penetrating the second organic insulation film for reflection 217 to reach the source electrode 416 (refer to FIG. 16C). After that, ITO 19 is formed only on the organic insulation film for transmission 10 by a sputtering method. Moreover, molybdenum (Mo) as a barrier metal and aluminum (Al) as a reflective metal each are sequentially deposited to a film thickness of not less than 100 nm, preferably, not less than 200 nm. Furthermore, aluminum and molybdenum in the transmissive region 6 are removed together by wet etching to form a reflective electrode 18 in the reflective region 5 (refer to FIG. 16D). Note that an opposing substrate 12 can be manufactured by the same steps as those employed in the embodiment 1 and shown in FIGS. 10A to 10E and FIGS. 11A to 11D.

It should be noted that although a liquid crystal display device operating in a normally-white mode is exemplified in the above-described embodiments, the present invention is not limited to the normally-white liquid crystal display device. The present invention can be applied to a liquid crystal display device operating in a normally-black mode, which mode is defined such that a voltage is not applied between the opposing substrate and both the reflective region and the transmissive region to make liquid crystal molecules rise up and display "black," and a voltage is applied therebetween to make liquid crystal molecules lie in parallel with the surfaces of the substrates and display "white." A normally black liquid crystal includes a vertical alignment (VA) liquid crystal. The VA liquid crystal is a vertically aligned liquid crystal and defined such that liquid crystal molecules are aligned vertically in a situation where a voltage is not applied thereto and are made lying horizontally in a situation where a voltage is applied thereto. The VA liquid crystal is constructed such that liquid crystal molecules are twisted at an angle of 0 degree and the thickness of a liquid crystal layer in the reflective region is set to be about 2.0 µm to maximize the intensity of light exiting from the reflective region, and further, the thickness of a liquid crystal layer in the transmissive region is set to be about 4.0 µm to maximize the intensity of light exiting from the transmissive region.

Figure 1:
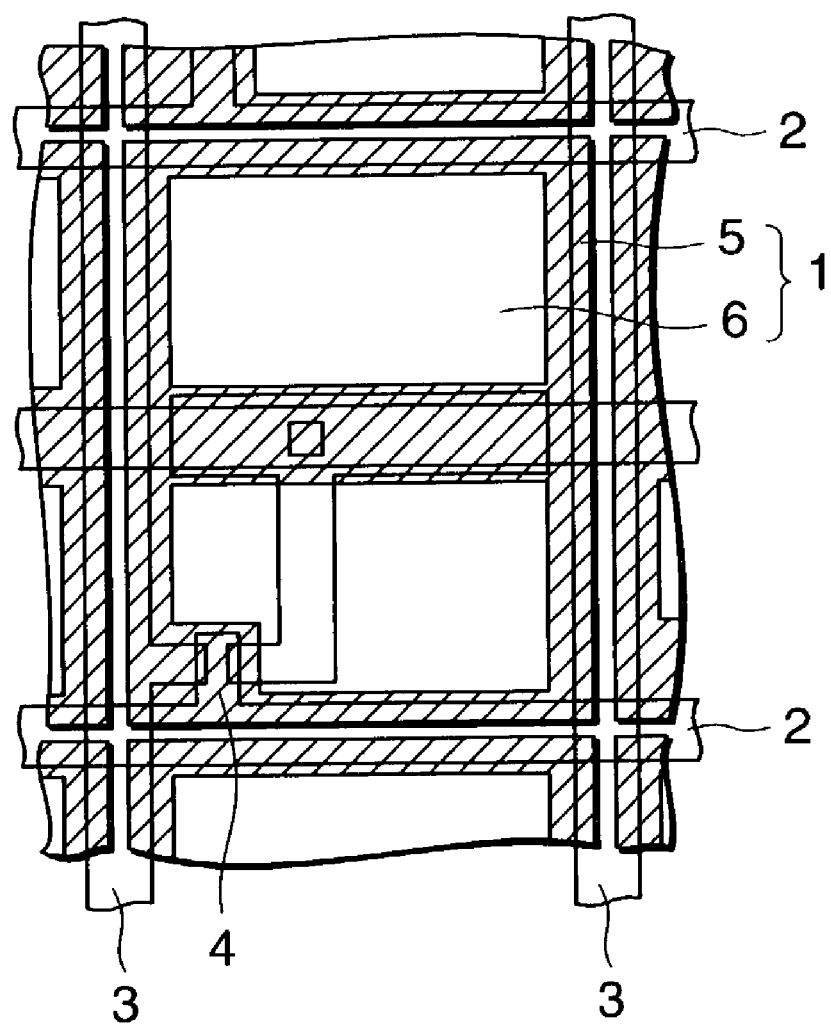
FIG. 1 is a plan view of a conventional semi-transmissive LCD device.
Figure 2:
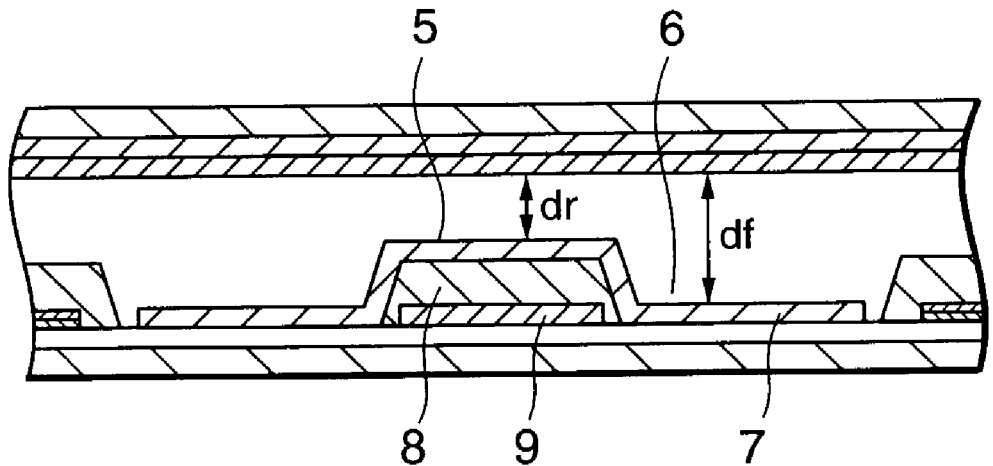
FIG. 2 is a cross-sectional view illustrating a reflective region and a transmissive region of a conventional semi-transmissive LCD device.
Figure 3:
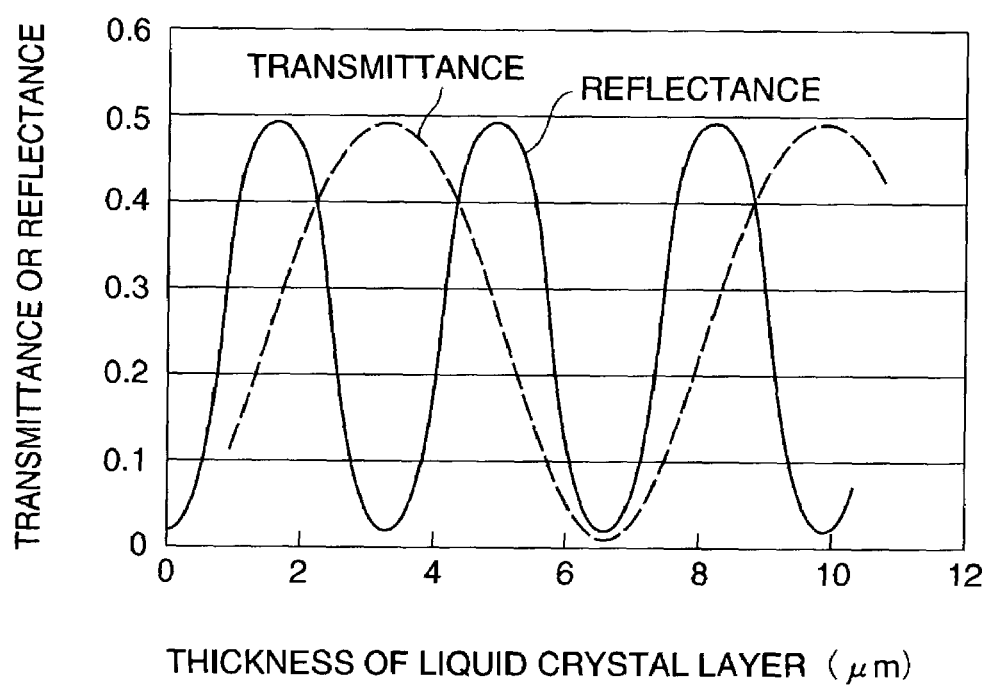
FIG. 3 is a graph illustrating the thickness of the liquid crystal layer and the intensity of emitted light in the transmissive mode and the reflective mode in the case of a twist angle φ=0 degree.
Figure 4:
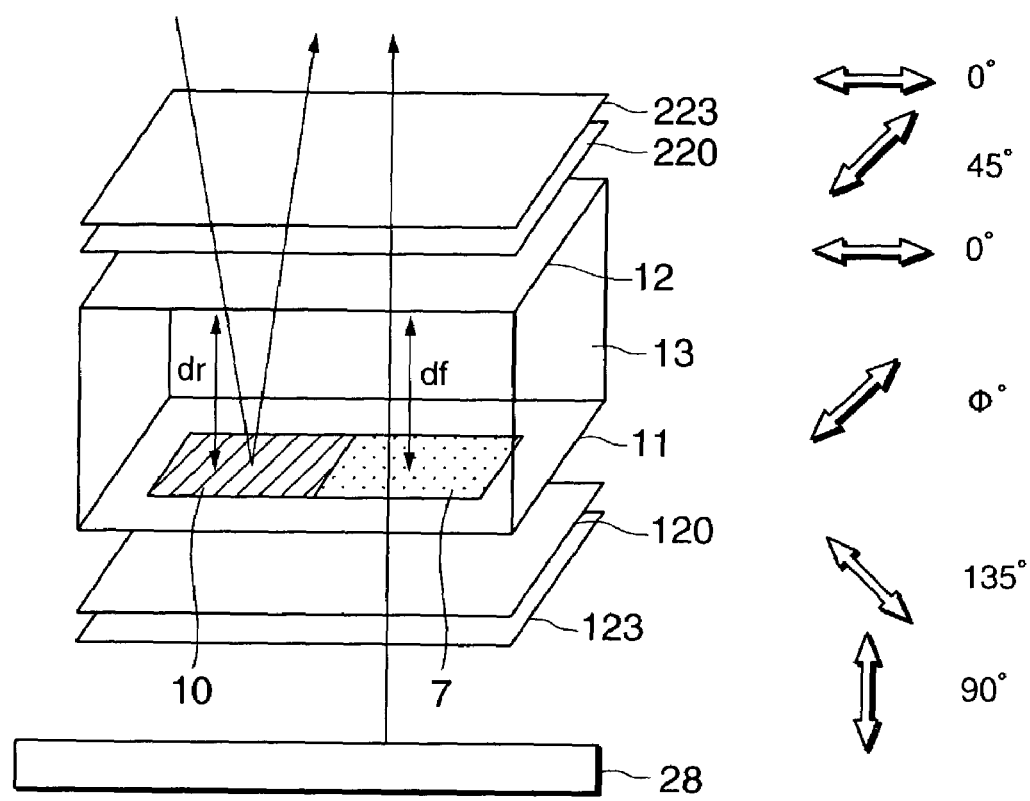
FIG. 4 is a schematic view illustrating a reflective region, a transmissive region and the state of polarization of each part within a single pixel.

The thicknesses of liquid crystal layers respectively in the reflective region and the transmissive region are set to be the associated values (shown, for example, in FIGS. 3 and 5) to maximize the intensity of light exiting from the corresponding regions and those thicknesses are set assuming a liquid crystal have a birefringence of 0.086 (Δn=0.086). Accordingly, since the intensity of light exiting from the corresponding region is determined by a birefringence (Δn) and a thickness of liquid crystal layer in the corresponding region, a thickness of liquid crystal layer corresponding to the maximum intensity of light exiting from the corresponding region varies depending on the birefringence.

(Embodiment 4)

The height dr0 defined as a distance between surfaces of the reflective electrode 18 and the passivation film 21 shown in FIG. 9 is determined by the film thicknesses of the transparent electrode 19, the first organic insulation film for reflection 117, the second organic insulation film for reflection 217 and the reflective electrode 18. The height df0 defined as a distance between surfaces of the transparent electrode 19 and the passivation film 21 is determined by the film thickness of the transparent electrode 19.

Figure 17:
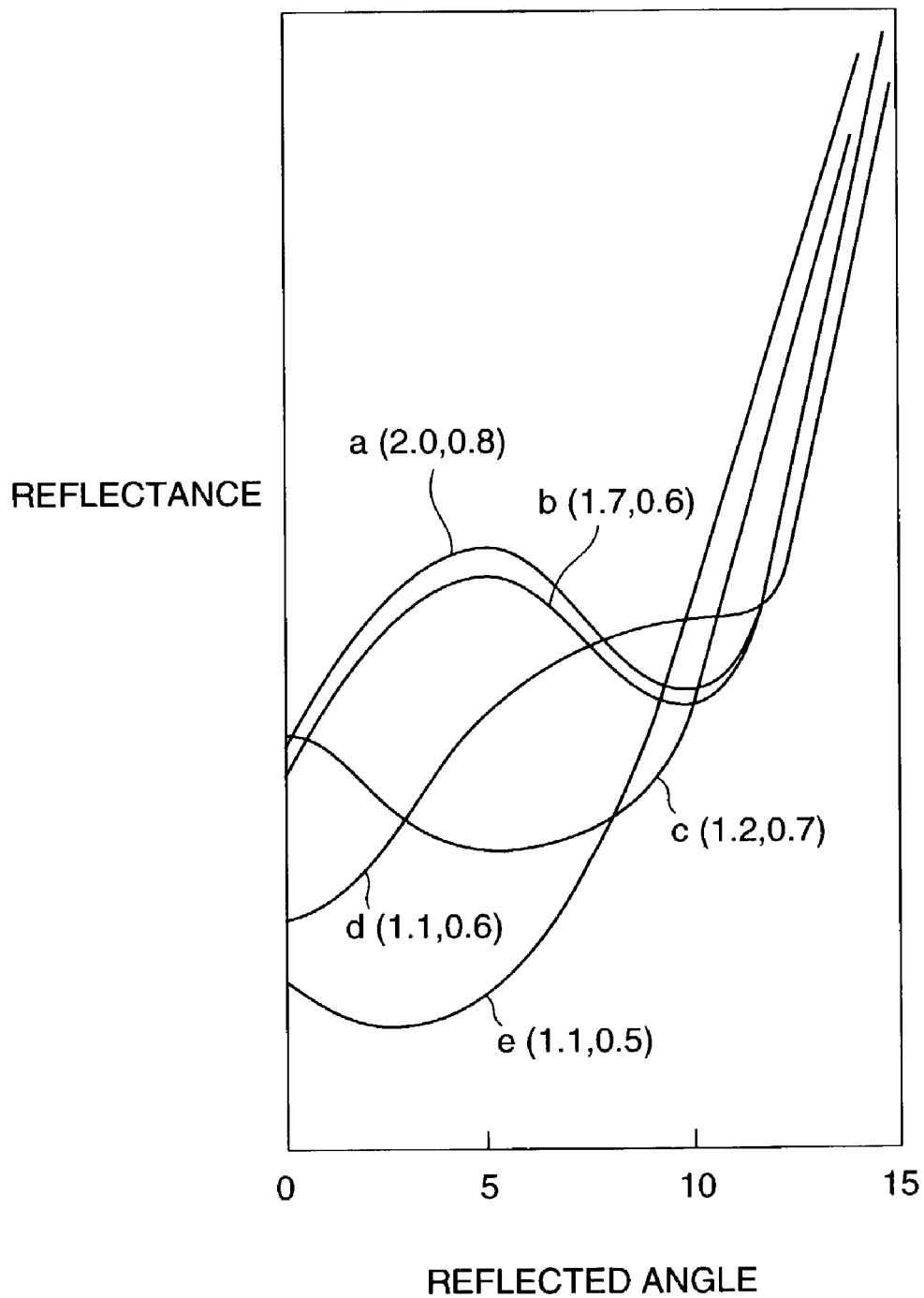
FIG. 17 is a graph illustrating how the relationship between the reflection angle and the reflectance changes as the film thickness of the first organic insulating film for reflection and the second organic insulating film for reflection, which constitute the insulating film for reflection, is varied.

Additionally, an optimal surface profile of the reflective electrode for effectively reflecting light incident on the reflective electrode in a direction normal to the reflector can be adjusted by the film thicknesses of the first organic insulation film for reflection 117 and the second organic insulation film for reflection 217. FIG. 17 illustrates resultant graphs indicating how a relationship between reflectance and reflected angle, which are defined in FIGS. 7A, 7B, varies depending on the film thicknesses of the first organic insulation film for reflection 117 and the second organic insulation film for reflection 217. The graphs are denoted by "a(X, Y)" to "e(X, Y)" and "X" represents the film thickness of the first organic insulation film for reflection 117, and "Y" represents the film thickness of the second organic insulation film for reflection 217. For example, the graph "a(X, Y)" represents the relationship between reflectance and reflected angle observed in the case where the film thickness of the first organic insulation film for reflection 117 is 2.0 µm and the film thickness of the second organic insulation film for reflection 217 is 0.8 µm.

Figure 7A:
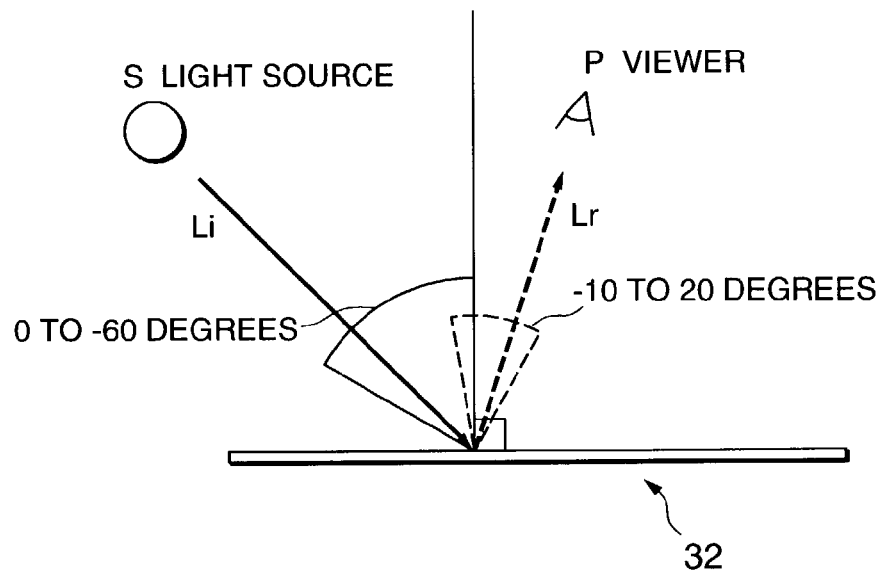
FIG. 7A is a schematic view illustrating a positional relationship among the light source, the reflector and a viewer.
Figure 7B:
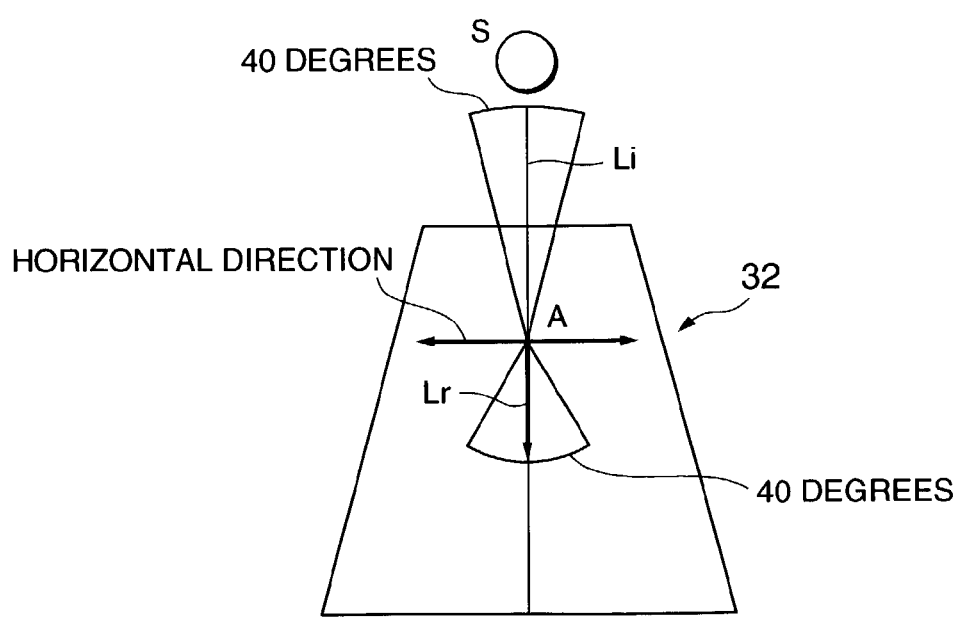
FIG. 7B is a schematic view illustrating the most likely situation where a viewer perceives reflected light.
Figure 8A:
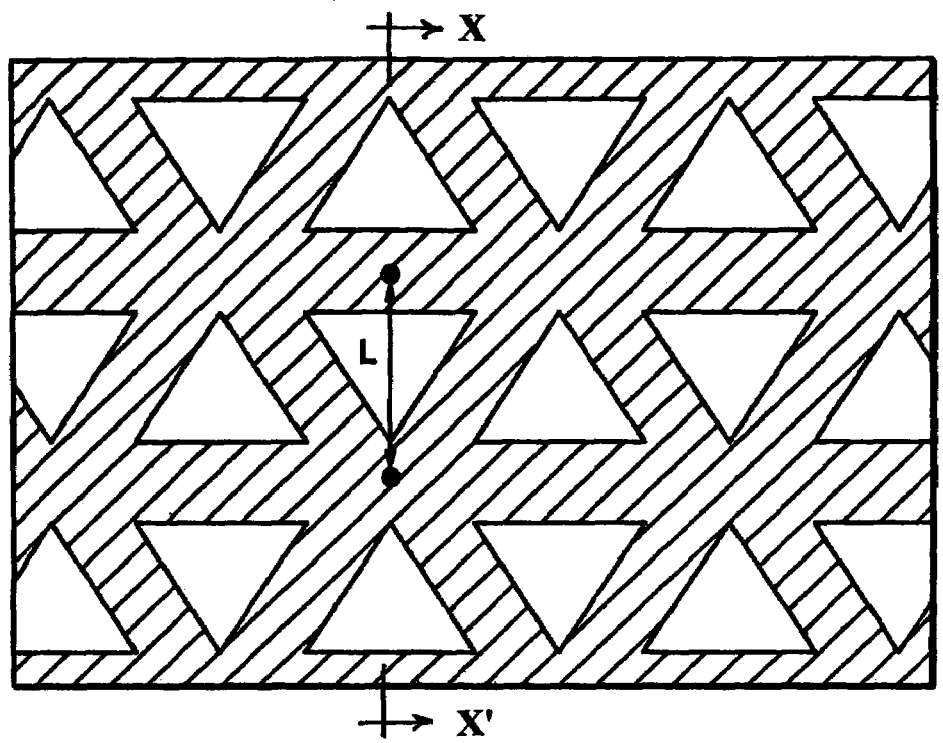
FIG. 8A is a plan view illustrating a conventional concave-convex pattern.
Figure 8B:
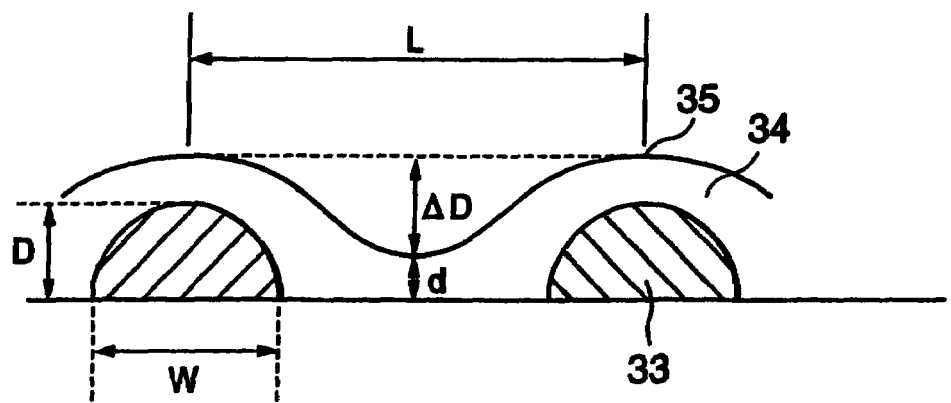
FIG. 8B is a cross-sectional view taken along a line X–X' in FIG. 8A.
Figure 18:
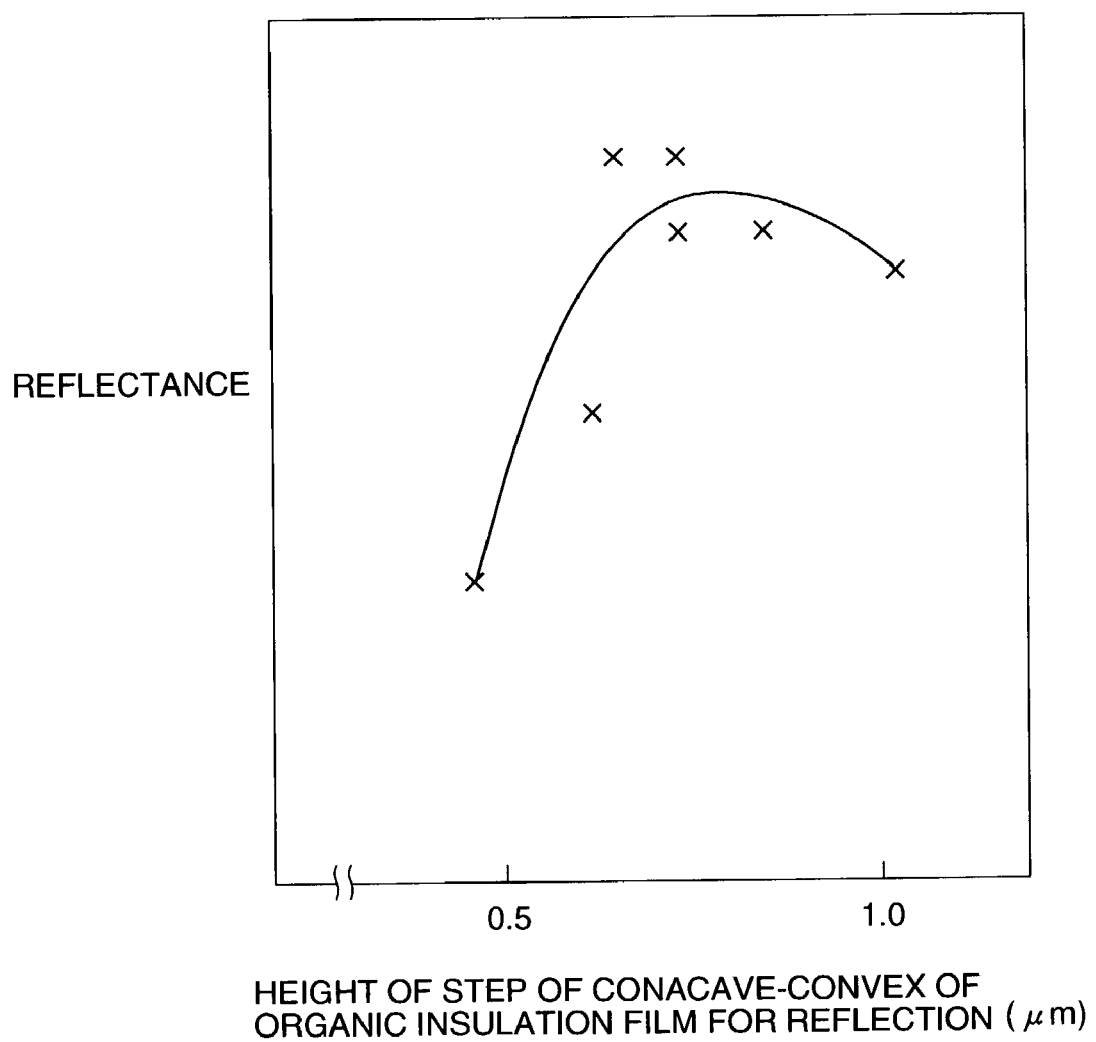
FIG. 18 is a graph illustrating a relationship between the step of concave-convex of the organic insulating film for reflection in Embodiment 4 and the reflectance.

Referring again to FIG. 8B, assume that the distance L between centers of the linear portions of the convex pattern 33 in a width direction is constant. Under this assumption, when the ΔD representing a height of the step of the concave-convex of the reflective electrode is small, specular reflection at the reflective electrode increases and reflection at the same in a direction normal to the reflector decreases. On the other hand, when the ΔD is large, reflected angle at the reflective electrode becomes too large and therefore, reflection at the same in a direction normal to the reflector decreases. Accordingly, it is assumed that ΔD representing a height of the step of the concave-convex of the reflective electrode and best suited to effectively reflect light incident on the reflective electrode in a direction normal to the reflector exists. Based on this assumption, the film thicknesses of the first organic insulation film for reflection 117 and the second organic insulation film for reflection 217 are made to vary and then, a relationship between reflectance and ΔD representing a height of the step of the concave-convex of the reflective electrode was evaluated. In this case, the reflectance is made equal to the value used when the reflected angle defined in FIGS. 7A, 7B is 0 degree. The results obtained by the evaluation are shown in FIG. 18. The results indicate that the reflectance becomes maximized when ΔD representing a height of the step of the concave-convex of the reflective electrode ranges from 0.5 to 1.0 µm.

Figure 19:
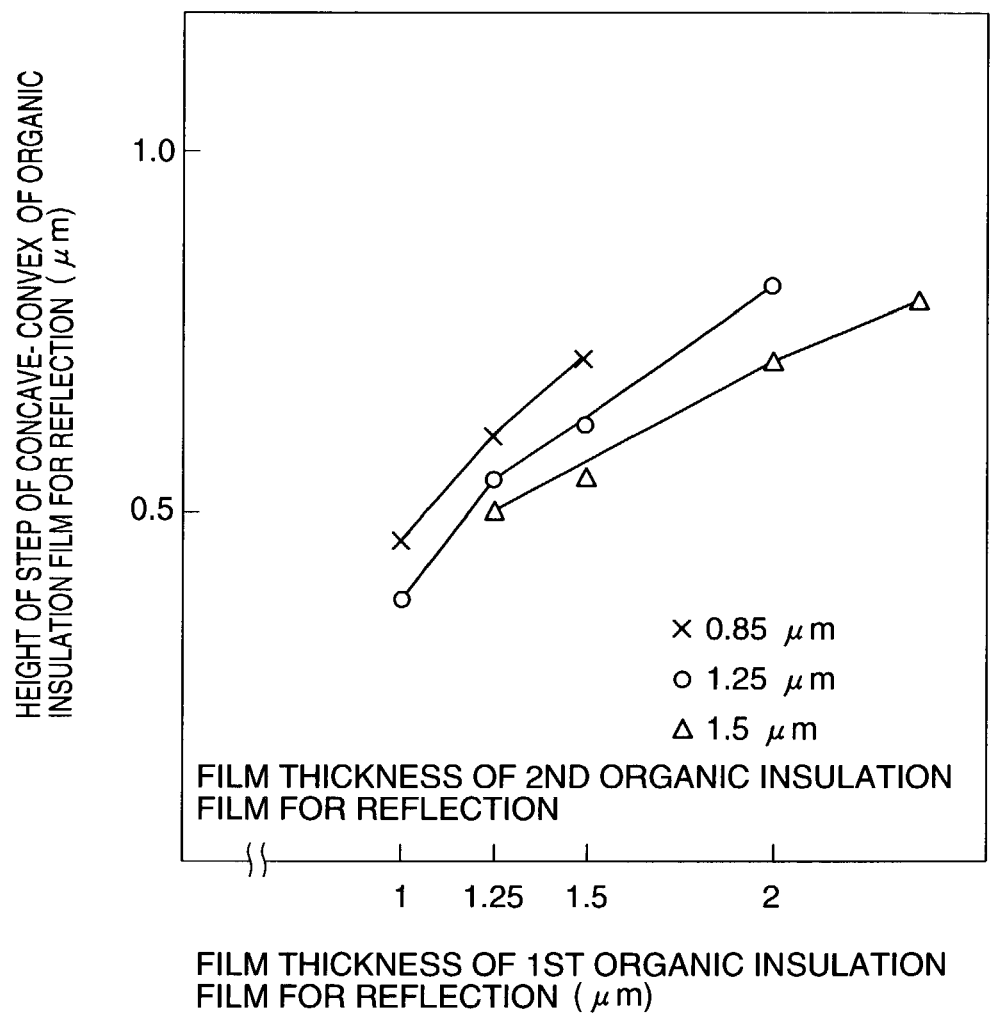
FIG. 19 is a graph illustrating a relationship between the film thickness of the first organic insulating film for reflection and the step of concave-convex of the organic insulating film for reflection.

Subsequently, while film thicknesses of the first organic insulation film for reflection 117 and the second organic insulation film for reflection 217 are made to vary, process conditions to make a height of the step of the concave-convex of the reflective electrode range from 0.5 to 1.0 µm were evaluated. The results obtained by the evaluation are shown in FIG. 19. The results indicate that when the film thicknesses of the first organic insulation film for reflection 117 and the second organic insulation film for reflection 217 are made thick, the ΔD representing a height of the step of the concave-convex of the reflective electrode also becomes large, and when the film thickness of the first organic insulation film for reflection 117 is made thick, the film thickness of the second organic insulation film for reflection 217 also needs to be made thick.

Figure 20:
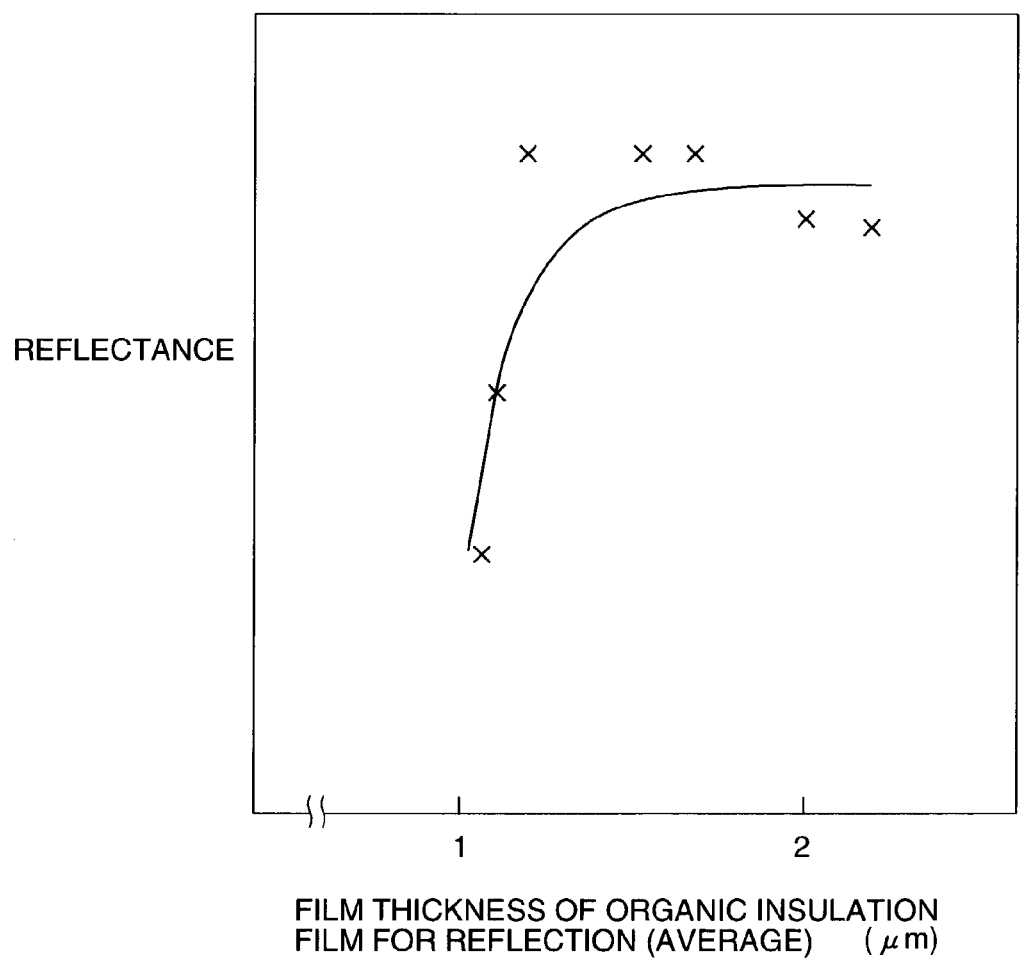
FIG. 20 is a graph illustrating a relationship between the film thickness and the reflectance of the organic insulating film for reflection in Embodiment 4.

Subsequently, relationship between the film thickness and reflectance of the insulation film for reflection, which thickness and reflectance are determined by the film thicknesses of the first organic insulation film for reflection 117 and the second organic insulation film for reflection 217 was evaluated. Since the surface of the insulation film for reflection is formed to have a concave-convex profile, the film thickness thereof was calculated as a mean value. The concerned reflectance in case of a reflected angle defined in FIGS. 7A, 7B being zero is used. The results obtained by the evaluation are shown in FIG. 20. As can be seen from FIG. 20, the reflectance is saturated when the film thickness of the insulation film for reflection is 1.5 $\mu$m. Note that making the film thickness of the insulation film for reflection not less than 2.0 $\mu$m ensures the situation where the reflectance is being saturated at a high level.

The evaluation thus performed indicates that in order to effectively reflect light incident on the reflector in a direction normal to the reflector, it is preferable that the film thickness of the insulation film for reflection is made not less than 1.5 $\mu$m, preferably, not less than 2.0 $\mu$m, and the $\Delta$D representing a height of the step of the concave-convex of the reflective electrode is made ranging from 0.5 $\mu$m to 1.0 $\mu$m.

the reflective region coincide with that of the transmissive region, the film thickness of the color layer in the reflective region is made thinner than that in the transmissive region. Furthermore, although the film thickness of the reflective electrode in the reflective region is assumed zero in the explanation of FIG. 9, this case assumes the film thickness of 0.3 $\mu$m. The reason why two film thicknesses of the organic insulation film for reflection are made to correspond to each twist angle is that the reflecting characteristics of the reflective electrode vary depending on the film thickness thereof and the difference between the film thicknesses of the color layers in the two regions varies accordingly. For example, in case of 55 degree twist angle, although making the film thickness of the organic insulation film for reflection 2.2 $\mu$m allows the corresponding reflectance to be sufficiently high, a problem arises in that a height of the step caused by the color layers in the two regions becomes large. In contrast, when making the film thickness of the organic insulation film for reflection 1.7 $\mu$m, although the difference between the film thicknesses of the color layers in the two regions can advantageously be made small and further, the reflectance can approximately be made high, the reflectance also has possibility to decrease a little bit lower than the desired value.

TABLE I

| Twist angle | Thickness of liquid crystal layer in transmissive region ($\mu$m) | Thickness of liquid crystal layer in reflective region ($\mu$m) | Difference in thickness of liquid crystal layer ($\mu$m) | Film thickness of reflective electrode in reflective region ($\mu$m) | Film thickness of organic insulation film for reflection ($\mu$m) | Difference in film thickness of color layer ($\mu$m) |
|---|---|---|---|---|---|---|
| 55 degrees | 2.7 | 1.7 | 1.0 | 0.3 | 2.2 | 1.5 |
|  | 2.7 | 1.7 | 1.0 | 0.3 | 1.7 | 1.0 |
| 40 degrees | 2.8 | 1.5 | 1.3 | 0.3 | 2.2 | 1.2 |
|  | 2.8 | 1.5 | 1.3 | 0.3 | 1.7 | 0.7 |
| 0 degree | 2.9 | 1.4 | 1.5 | 0.3 | 2.2 | 1.0 |
|  | 2.9 | 1.4 | 1.5 | 0.3 | 1.7 | 0.5 |

(Embodiment 5)

Taking into account the results obtained by the evaluation performed in the embodiment 4, how a difference between heights of the surfaces of the reflective electrode 18 and the transmissive and a difference between the film thicknesses of the color layer for reflection and the color layer for transmission vary depending on the twist angle $\Phi$ is simulated in unit of $\mu$m and shown in Table. 1. In this case, the case, shown in FIG. 9, where the organic insulation film for transmission is not formed is assumed because the transmittance can be made large. A birefringence of 0.086 ($\Delta$n=0.086) is used in this case. A difference between the thicknesses of liquid crystal layers means the difference between the thicknesses of liquid crystal layers in the transmissive region and the reflective region, and the difference between the film thicknesses of color layers in the transmissive region and the reflective region also contributes to the difference between the thicknesses of liquid crystal layers. In this case, the situation where the thickness of liquid crystal layer in the transmissive region is thicker than that in the reflective region is assumed. The reason is as follows. Light incident on the reflective region travels forward and backward through the color layer in the reflective region, i.e., two times therethrough. Accordingly, it is preferable that in order to make the color reproduction range of In the present invention, the film thickness of an insulation film for reflection is made such that the reflector exhibits maximum efficiency when reflecting light incident thereon and the film thickness of an organic insulation film for transmission is made zero. At the same time, the thicknesses of the liquid crystal layers in the reflective region and the transmissive region are adjusted such that the intensity of light exiting from the device becomes maximum. As could be understood by those skill in the art, the thickness of the liquid crystal layer in the reflective region is adjusted by varying the film thicknesses of the insulation film for reflection and the color layer in the reflective region, and the thickness of the liquid crystal layer in the transmissive region is adjusted by varying the film thickness of the color layer in the transmissive region, thereby providing a semi-transmissive liquid crystal display device with bright display in a simplified manner. In addition, since an organic insulation film does not exist in the transmissive region, the transmittance of the device increases correspondingly.

However, in a situation where an organic insulation film does not exist in the transmissive region, the difference between the film thicknesses of the color layers in the reflective region and the transmissive region probably increases. In order to make small the difference between the film thicknesses of the color layers in the reflective region and the transmissive region, the transmissive region may have an insulation film including an organic insulation film formed therein. As described above, the thickness of the liquid crystal layer in the reflective region is adjusted by varying the film thicknesses of the insulation film for reflection and the color layer in the reflective region, and the thickness of the liquid crystal layer in the transmissive region is adjusted by varying the film thicknesses of the insulation film for transmission and the color layer in the transmissive region, thereby providing a semi-transmissive liquid crystal display device with bright display in a simplified manner. In addition, since the difference between the film thicknesses of the color layers in the reflective region and the transmissive region can be made small, i.e., within a specific range, even when a boundary between the reflective region and the transmissive region of the TFT substrate is displaced in a planar direction from a boundary between the color layers in the reflective region and the transmissive region of the opposing substrate, change of coloring of the device can be suppressed within an allowable range.

As described so far, the liquid crystal display device of the present invention includes: a plurality of wiring lines formed on a first substrate while intersecting one another in longitudinal and lateral directions; a plurality of pixels defined by the plurality of wiring lines that partition a display area on the first substrate; a reflective region, provided in all the pixels, for reflecting light from a display plane; a transmissive region for allowing light from a backlight located opposite the plurality of pixels with reference to the first substrate to transmit therethrough; an insulation film for reflection and a reflective electrode thereon, both being formed in the reflective region on the first substrate; a transparent electrode formed in the transmissive region on the first substrate; a second substrate disposed facing the first substrate; a color layer for reflection formed in a position corresponding to the reflective region on the second substrate; a color layer for transmission formed in a position corresponding to the transmissive region on the second substrate; a common electrode formed so as to cover the color layer for reflection the color layer for transmission; and a liquid crystal layer interposed between the first and the second substrates.

The liquid crystal display device, configured as described above, of the present invention is characterized in that the thickness of the liquid crystal layer interposed between the surfaces of the reflective electrode and the color layer for reflection, and located to correspond to the reflective region, and the thickness of the liquid crystal layer interposed between the surfaces of the transparent electrode and the color layer for transmission, and located to correspond to the transmissive region are made to have corresponding values for maximizing both the reflectance of the reflective region and the transmittance of the transmissive region with respect to each twist angle in case of a specific birefringence of liquid crystal cell.

Configuring the semi-transmissive liquid crystal display device as described above makes it possible to maximize both the reflectance of the reflective region and the transmittance of the transmissive region with respect to each twist angle of liquid crystal molecules.

What is claimed is:

1. A liquid crystal display device, comprising:
   a first substrate;
   a plurality of pixel electrodes formed on said first substrate, each of said pixel electrodes including a reflective region and a transmissive region;
   a first insulation film interposed between said reflective region and said first substrate;
   a second substrate disposed in opposition to said first substrate;
   a first color layer formed on said second substrate and disposed at a location corresponding to said reflective region;
   a second color layer formed on said second substrate and disposed at a location corresponding to said transmissive region;
   a common electrode covering said first color layer and said second color layer; and
   a liquid crystal layer interposed between said first substrate and said second substrate,
   wherein the thickness of said liquid crystal layer at the location corresponding to said reflective region and the thickness of said liquid crystal layer at the location corresponding to said transmissive region are equal when said liquid crystal layer has a twist angle of 72 degrees, and as said twist angle decreases from 72 degrees to 0 degrees, the difference between said thickness of said liquid crystal layer at said location corresponding to said reflective region and said thickness of said liquid crystal layer at said location corresponding to said transmissive region increases until said thickness of said liquid crystal layer at said location corresponding to said reflective region becomes substantially one-half said thickness of said liquid crystal layer at said location corresponding to said transmissive region when said twist angle=0.

2. The liquid crystal display device according to claim 1, wherein the thickness of said liquid crystal layer at said location corresponding to said reflective region and the thickness of said liquid crystal layer at said location corresponding to said transmissive region maximize, respectively, reflectance in said reflective region and transmittance in said transmissive region with respect to individual twist angles of liquid crystal molecules of said liquid crystal layer.

* * * * *